US012694786B2

(12) United States Patent (10) Patent No.: US 12,694,786 B2
Suzuki et al. (45) Date of Patent: Jul. 28, 2026

(54) INFORMATION PROCESSING APPARATUS, INFORMATION PROCESSING METHOD, AND NON-TRANSITORY COMPUTER-READABLE STORAGE MEDIUM

(71) Applicants: Sony Group Corporation, Tokyo (JP); Sony Semiconductor Solutions Corporation, Kanagawa (JP)

(72) Inventors: Seiji Suzuki, Tokyo (JP); Shinichi Iriya, Tokyo (JP); Katsuji Miyazawa, Tokyo (JP); Satoshi Akagawa, Tokyo (JP)

(73) Assignees: Sony Group Corporation, Tokyo (JP); Sony Semiconductor Solutions Corporation, Kanagawa (JP)

( * ) Notice: Subject to any disclaimer, the term of this patent is extended or adjusted under 35 U.S.C. 154(b) by 20 days.

(21) Appl. No.: 18/836,360

(22) PCT Filed: Feb. 14, 2023

(86) PCT No.: PCT/JP2023/004912
§ 371 (c)(1),
(2) Date: Aug. 7, 2024

(87) PCT Pub. No.: WO2023/162769
PCT Pub. Date: Aug. 31, 2023

(65) Prior Publication Data
US 2025/0174126 A1 May 29, 2025

(30) Foreign Application Priority Data

Feb. 24, 2022 (JP) ................................. 2022-026439
Jan. 11, 2023 (JP) ................................. 2023-002709

(51) Int. Cl.
*G08G 1/14* (2006.01)
*G06F 3/04817* (2022.01)
(Continued)

(52) U.S. Cl.
CPC ......... *G08G 1/143* (2013.01); *G06F 3/04817* (2013.01); *G06V 20/586* (2022.01); *G08G 1/0969* (2013.01); *G08G 1/144* (2013.01)

(58) Field of Classification Search
None
See application file for complete search history.

(56) References Cited

U.S. PATENT DOCUMENTS

2004/0254840 A1* 12/2004 Slemmer ........... G06Q 30/0633
705/28
2018/0259346 A1 9/2018 Katsumata
(Continued)

FOREIGN PATENT DOCUMENTS

CN 112183485 A * 1/2021 ............. G06F 18/22
CN 114512024 A * 5/2022 ............. G08G 1/148
(Continued)

OTHER PUBLICATIONS

International Search Report and Written Opinion mailed on Apr. 4, 2023, received for PCT Application PCT/JP2023/004912, filed on Feb. 14, 2023, 8 pages.

*Primary Examiner* — Fekadeselassie Girma
(74) *Attorney, Agent, or Firm* — XSENSUS LLP

(57) ABSTRACT

An image processing apparatus for this determination includes processing circuitry configured to acquire feature information about a vehicle or a person in a parking lot, e.g., information on at least one feature among a color, an orientation, a location, a size, a vehicle brand, and a vehicle type, using information detected by a sensor; and generate a parking lot map including an icon corresponding to the
(Continued)

vehicle or the person. The icon includes information on at least one feature among a color, an orientation, a location, a size, a vehicle brand, and a vehicle type of an object such as a vehicle and a person.

19 Claims, 30 Drawing Sheets

(51) Int. Cl.
    *G06V 20/58*       (2022.01)
    *G08G 1/0969*   (2006.01)

(56) References Cited

U.S. PATENT DOCUMENTS

| | | | |
|---|---|---|---|
| 2018/0308358 A1 | 10/2018 | Hayakawa | |
| 2019/0382001 A1* | 12/2019 | Chelian | B60W 30/06 |
| 2020/0079359 A1 | 3/2020 | Tsujino | |
| 2020/0211071 A1* | 7/2020 | Rosas-Maxemin | |
| | | | G06Q 30/0284 |
| 2021/0107468 A1 | 4/2021 | Wang | |
| 2022/0013012 A1* | 1/2022 | Higuchi | G08G 1/143 |
| 2022/0262297 A1* | 8/2022 | Aoki | B60K 35/10 |
| 2023/0100851 A1* | 3/2023 | Zilberman | G01C 21/206 |
| | | | 701/423 |
| 2023/0206764 A1* | 6/2023 | Zilberman | G08G 1/142 |

FOREIGN PATENT DOCUMENTS

| | | | |
|---|---|---|---|
| JP | H05-006500 A | 1/1993 | |
| JP | 2009-205191 A | 9/2009 | |
| JP | 2015-069429 A | 4/2015 | |
| JP | 2019-164694 A | 9/2019 | |
| JP | 2020-040441 A | 3/2020 | |
| JP | 2020-135103 A | 8/2020 | |
| JP | 2020-142690 A | 9/2020 | |
| JP | 2021-062715 A | 4/2021 | |
| JP | 2021-117816 A | 8/2021 | |
| TW | 201503054 A * | 1/2015 | G06T 11/60 |

* cited by examiner

TRAVEL ROUTE

10 VEHICLE

FIG. 8

| | EXAMPLE OF VEHICLE ICON | | DETAIL |
|---|---|---|---|
| (1) | REAR SIDE | FRONT SIDE | VEHICLE ICON IN WHICH SIDE MIRROR-MOUNTED SIDE IS FRONT SIDE |
| (2) | REAR SIDE | FRONT SIDE | VEHICLE ICON IN WHICH HEADLIGHT-MOUNTED SIDE IS FRONT SIDE |
| (3) | REAR SIDE | FRONT SIDE | VEHICLE ICON IN WHICH WINDSHIELD-MOUNTED SIDE IS FRONT SIDE |
| (4) | REAR SIDE | FRONT SIDE | VEHICLE ICON INCLUDING ALL OF (1) TO (3) |
| (5) | REAR SIDE | FRONT SIDE | VEHICLE ICON TO WHICH IDENTIFICATION MARK INDICATING FRONT SIDE IS ADDED |

*FIG. 10*

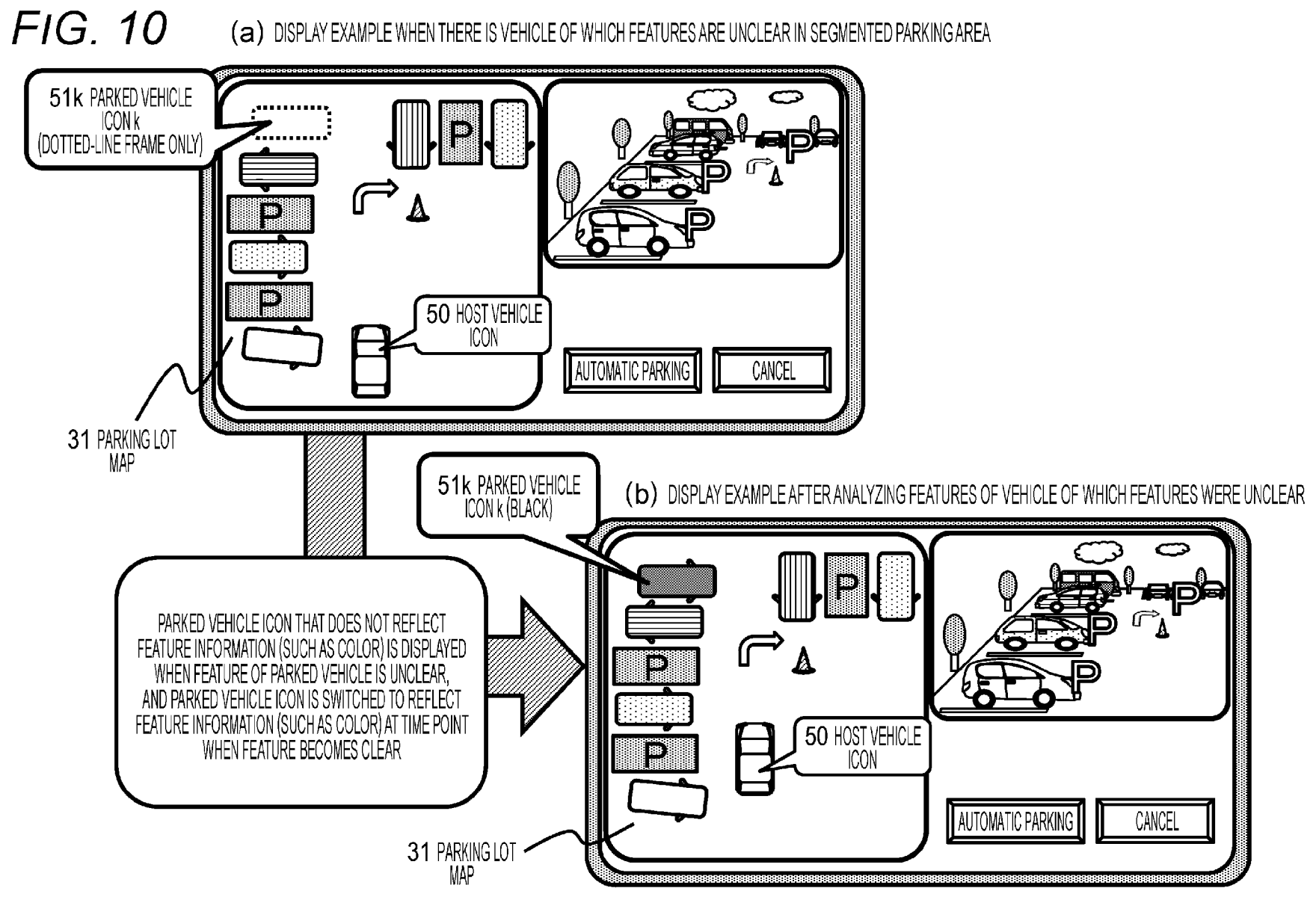

(a) DISPLAY EXAMPLE WHEN THERE IS VEHICLE OF WHICH FEATURES ARE UNCLEAR IN SEGMENTED PARKING AREA

51k PARKED VEHICLE ICON k (DOTTED-LINE FRAME ONLY)

50 HOST VEHICLE ICON

CANCEL

AUTOMATIC PARKING

31 PARKING LOT MAP (b) DISPLAY EXAMPLE AFTER ANALYZING FEATURES OF VEHICLE OF WHICH FEATURES WERE UNCLEAR

51k PARKED VEHICLE ICON k (BLACK)

50 HOST VEHICLE ICON

CANCEL

AUTOMATIC PARKING

31 PARKING LOT MAP

PARKED VEHICLE ICON THAT DOES NOT REFLECT FEATURE INFORMATION (SUCH AS COLOR) IS DISPLAYED WHEN FEATURE OF PARKED VEHICLE IS UNCLEAR, AND PARKED VEHICLE ICON IS SWITCHED TO REFLECT FEATURE INFORMATION (SUCH AS COLOR) AT TIME POINT WHEN FEATURE BECOMES CLEAR (a) DISPLAY EXAMPLE WHEN COLOR OF PARKED VEHICLE IS UNCLEAR (b) DISPLAY EXAMPLE WHEN ORIENTATION OF PARKED VEHICLE IS UNCLEAR (c) DISPLAY EXAMPLE WHEN SIZE OF PARKED VEHICLE IS UNCLEAR (d) DISPLAY EXAMPLE WHEN SHAPE OF PARKED VEHICLE IS UNCLEAR

FIG. 12

23b PEDESTRIAN b (COLOR OF CLOTHES=GREEN)

23a PEDESTRIAN a (COLOR OF CLOTHES=RED)

10 VEHICLE

30 DISPLAY UNIT

FIG. 16

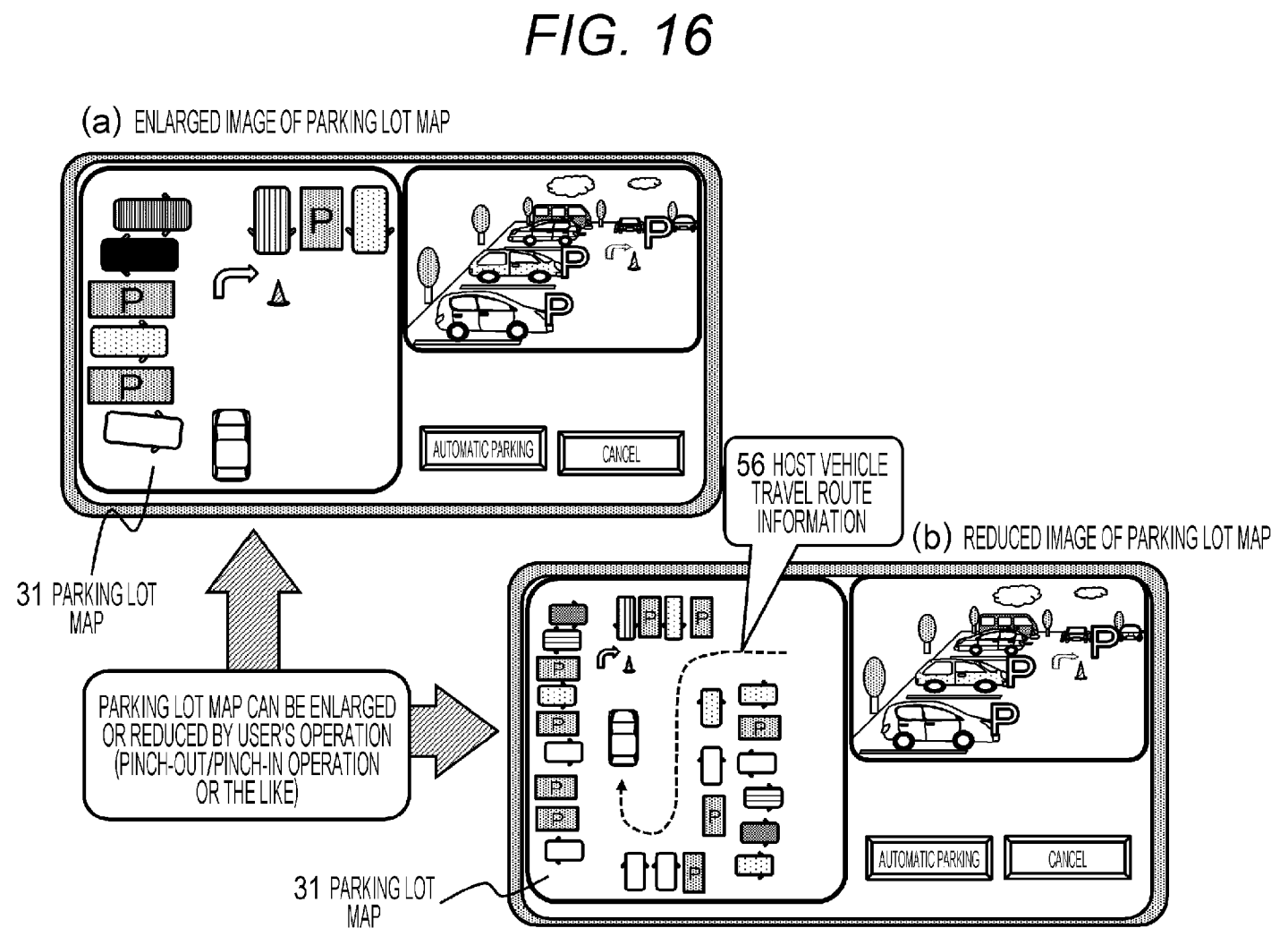

(a) ENLARGED IMAGE OF PARKING LOT MAP

AUTOMATIC PARKING    CANCEL

31 PARKING LOT MAP

PARKING LOT MAP CAN BE ENLARGED OR REDUCED BY USER'S OPERATION (PINCH-OUT/PINCH-IN OPERATION OR THE LIKE)

56 HOST VEHICLE TRAVEL ROUTE INFORMATION (b) REDUCED IMAGE OF PARKING LOT MAP

AUTOMATIC PARKING    CANCEL

31 PARKING LOT MAP

FIG. 19

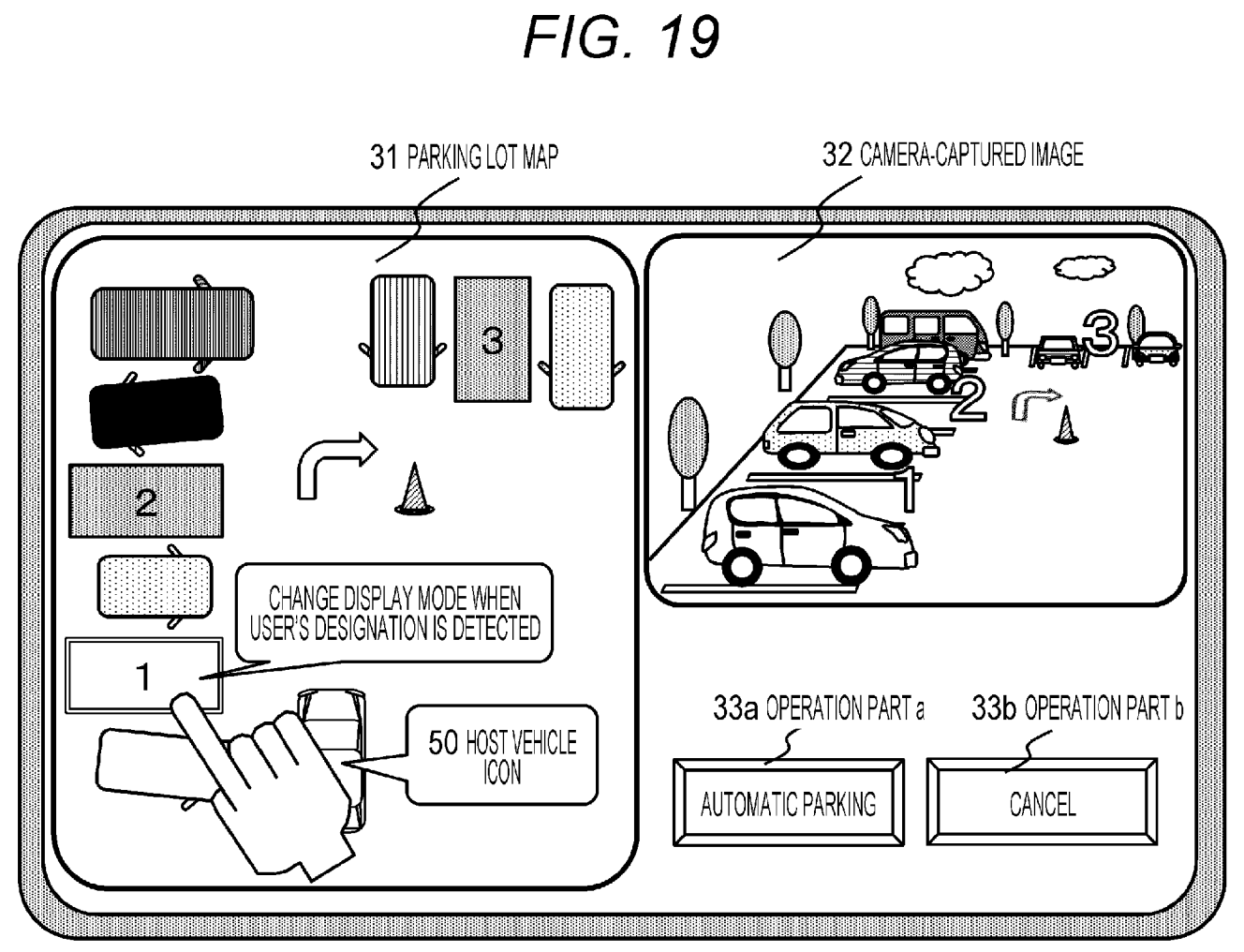

31 PARKING LOT MAP

32 CAMERA-CAPTURED IMAGE

CHANGE DISPLAY MODE WHEN USER'S DESIGNATION IS DETECTED

50 HOST VEHICLE ICON

33a OPERATION PART a

33b OPERATION PART b

AUTOMATIC PARKING

CANCEL

Figure 22:
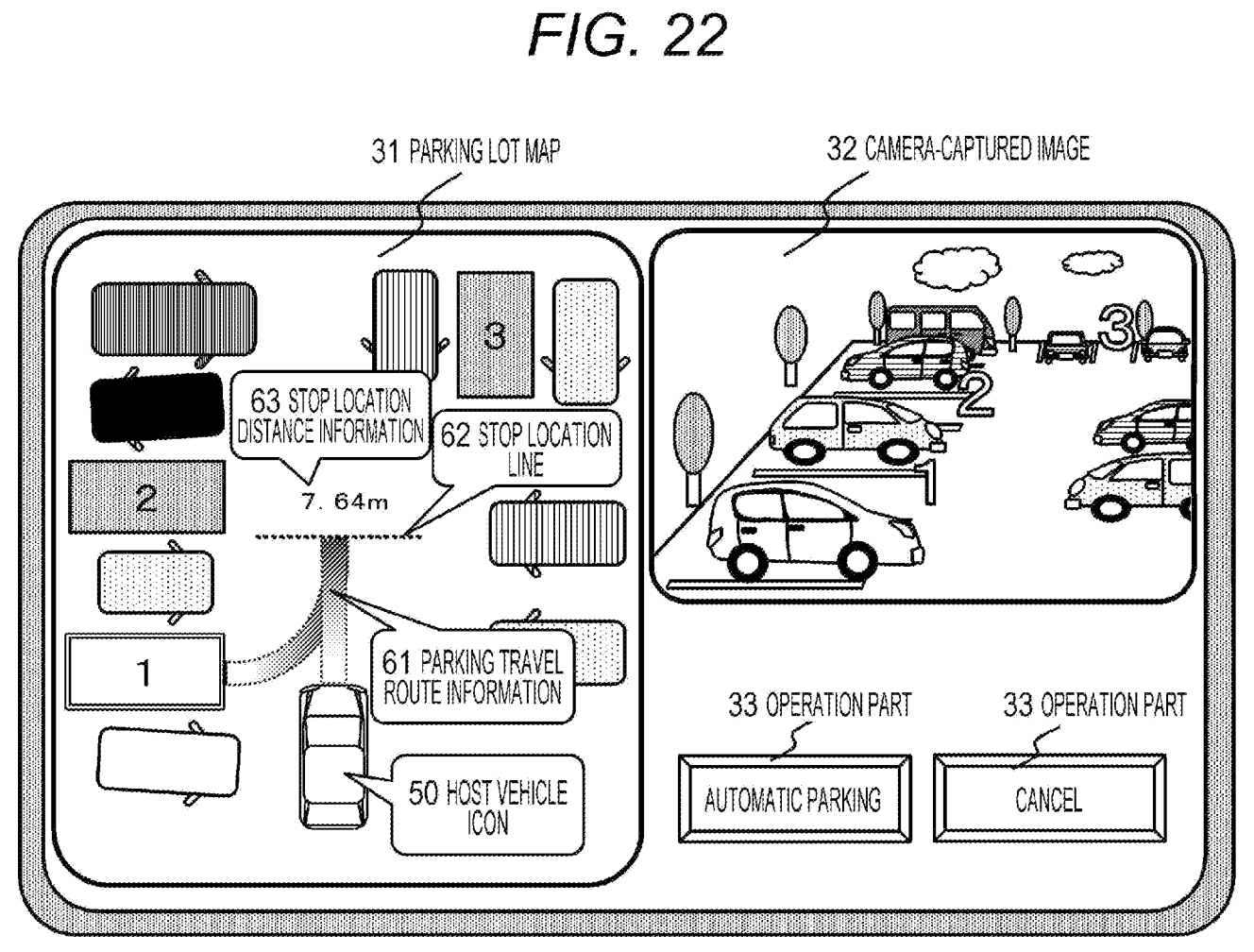

32 CAMERA-CAPTURED IMAGE

31 PARKING LOT MAP

62 STOP LOCATION LINE

63 STOP LOCATION DISTANCE INFORMATION 7. 64 m

61 PARKING TRAVEL ROUTE INFORMATION

50 HOST VEHICLE ICON

33 OPERATION PART

AUTOMATIC PARKING

33 OPERATION PART

CANCEL

FIG. 24

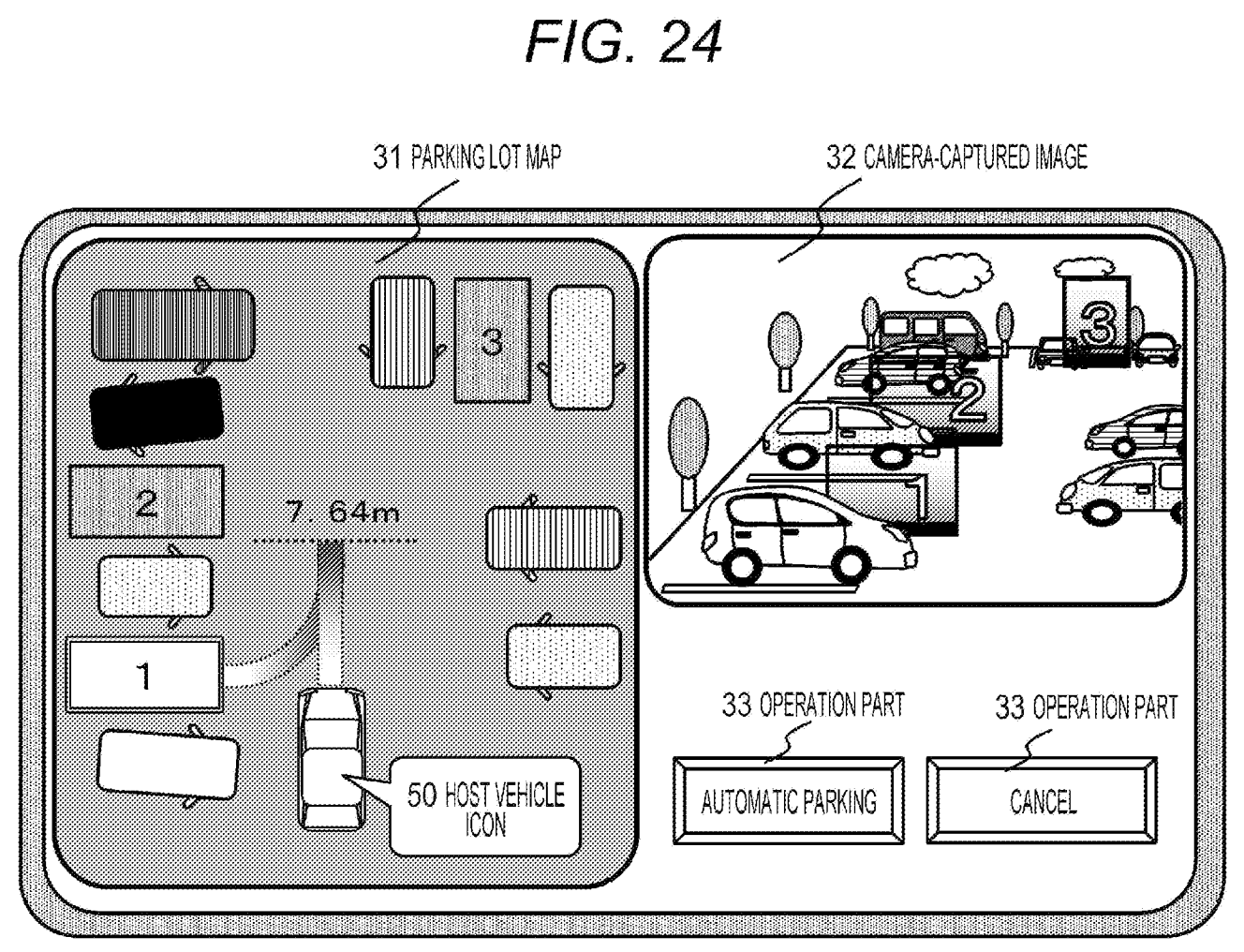

32 CAMERA-CAPTURED IMAGE

31 PARKING LOT MAP 7.64m

50 HOST VEHICLE ICON

33 OPERATION PART

33 OPERATION PART

AUTOMATIC PARKING

CANCEL

FIG. 27

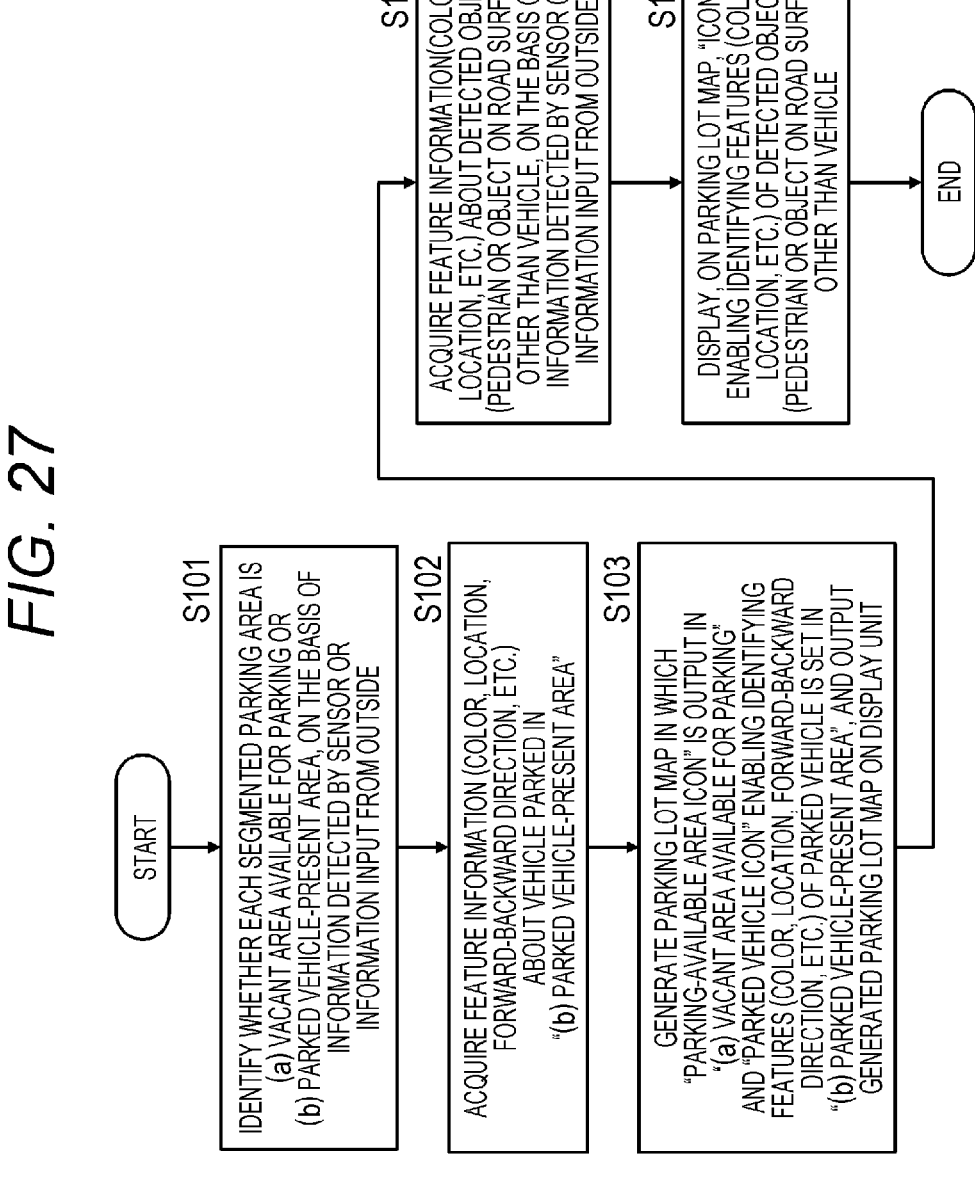

START

S101
IDENTIFY WHETHER EACH SEGMENTED PARKING AREA IS
(a) VACANT AREA AVAILABLE FOR PARKING OR
(b) PARKED VEHICLE-PRESENT AREA, ON THE BASIS OF
INFORMATION DETECTED BY SENSOR OR
INFORMATION INPUT FROM OUTSIDE

S102
ACQUIRE FEATURE INFORMATION (COLOR, LOCATION,
FORWARD-BACKWARD DIRECTION, ETC.)
ABOUT VEHICLE PARKED IN
"(b) PARKED VEHICLE-PRESENT AREA"

S103
GENERATE PARKING LOT MAP IN WHICH
"PARKING-AVAILABLE AREA ICON" IS OUTPUT IN
"(a) VACANT AREA AVAILABLE FOR PARKING"
AND "PARKED VEHICLE ICON" ENABLING IDENTIFYING
FEATURES (COLOR, LOCATION, FORWARD-BACKWARD
DIRECTION, ETC.) OF PARKED VEHICLE IS SET IN
"(b) PARKED VEHICLE-PRESENT AREA", AND OUTPUT
GENERATED PARKING LOT MAP ON DISPLAY UNIT

S104
ACQUIRE FEATURE INFORMATION (COLOR,
LOCATION, ETC.) ABOUT DETECTED OBJECT
(PEDESTRIAN OR OBJECT ON ROAD SURFACE)
OTHER THAN VEHICLE, ON THE BASIS OF
INFORMATION DETECTED BY SENSOR OR
INFORMATION INPUT FROM OUTSIDE

S105
DISPLAY, ON PARKING LOT MAP, "ICON"
ENABLING IDENTIFYING FEATURES (COLOR,
LOCATION, ETC.) OF DETECTED OBJECT
(PEDESTRIAN OR OBJECT ON ROAD SURFACE)
OTHER THAN VEHICLE

END

*FIG. 28*

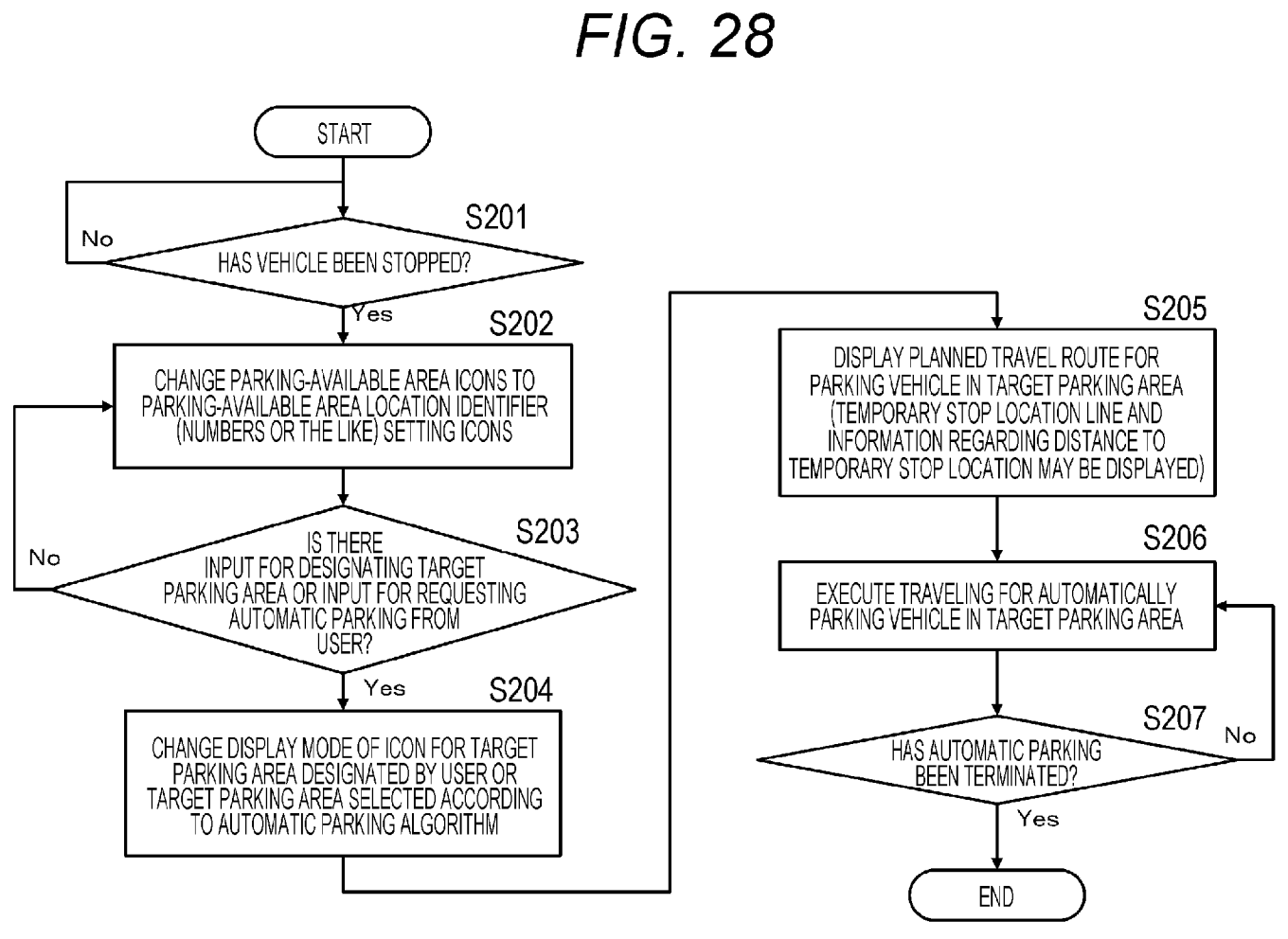

START

S201

HAS VEHICLE BEEN STOPPED?

No

Yes

S202

CHANGE PARKING-AVAILABLE AREA ICONS TO PARKING-AVAILABLE AREA LOCATION IDENTIFIER (NUMBERS OR THE LIKE) SETTING ICONS

S203

IS THERE INPUT FOR DESIGNATING TARGET PARKING AREA OR INPUT FOR REQUESTING AUTOMATIC PARKING FROM USER?

No

Yes

S204

CHANGE DISPLAY MODE OF ICON FOR TARGET PARKING AREA DESIGNATED BY USER OR TARGET PARKING AREA SELECTED ACCORDING TO AUTOMATIC PARKING ALGORITHM

S205

DISPLAY PLANNED TRAVEL ROUTE FOR PARKING VEHICLE IN TARGET PARKING AREA (TEMPORARY STOP LOCATION LINE AND INFORMATION REGARDING DISTANCE TO TEMPORARY STOP LOCATION MAY BE DISPLAYED)

S206

EXECUTE TRAVELING FOR AUTOMATICALLY PARKING VEHICLE IN TARGET PARKING AREA

S207

HAS AUTOMATIC PARKING BEEN TERMINATED?

No

Yes

END

*FIG. 29*

INFORMATION PROCESSING APPARATUS, INFORMATION PROCESSING METHOD, AND NON-TRANSITORY COMPUTER-READABLE STORAGE MEDIUM

CROSS-REFERENCE TO RELATED APPLICATIONS

This application is based on PCT filing PCT/JP2023/004912, filed Feb. 14, 2023, which claims the benefit of Japanese Priority Patent Application JP 2022-026439 filed on Feb. 24, 2022 and Japanese Priority Patent Application JP 2023-002709 filed on Jan. 11, 2023, the entire contents of each are incorporated herein by reference.

TECHNICAL FIELD

The present disclosure relates to an information processing apparatus, an information processing method, and a non-transitory computer-readable storage medium. Specifically, the present disclosure relates to an information processing apparatus, an information processing method, and a non-transitory computer-readable storage medium capable of generating display data for presenting an area that is available for a vehicle to park, for example, in a parking lot to a user who is a vehicle driver in an easy-to-understand manner.

BACKGROUND ART

For example, in many parking lots of shopping centers, amusement parks, sightseeing spots, and other places, many vehicles can be parked.

A user who is a driver of a vehicle searches for a vacant space available for parking in a parking lot and parks the vehicle in the vacant space.

In this case, the user drives the vehicle in the parking lot and directly checks the surroundings to search for a vacant area where no vehicle is parked from among a large number of segmented parking areas.

Such a process of checking a parking-available area takes time, and traveling in a narrow path of the parking lot is likely to cause a collision with another vehicle or a person.

An example of a conventional art disclosing a configuration for solving such a problem includes PTL 1 (Japanese Patent Application Laid-Open No. 2009-205191).

PTL 1 discloses a configuration for outputting display data that enables recognizing whether or not each segmented parking area in a parking lot is a vacant space, by converting an image captured by a camera of a vehicle to generate a bird's-eye view image that is similar to what is observed from above the parking lot, and displaying the generated bird's-eye view image on a monitor.

However, several distortions occur in the bird's-eye view image generated by converting the image captured by the camera of the vehicle. For example, many vehicles are displayed in a deformed manner, and it is often difficult to clearly determine whether there is a vehicle in each segmented parking area and what type of vehicle is parked in each segmented parking area.

Furthermore, in the bird's-eye view image including many distortions, even if it can be recognized that a vehicle is parked in a certain segmented parking area, it is often difficult to immediately determine which one the parked vehicle corresponds to among actually visible vehicles in the parking lot.

In such a case, as a result, the user needs to directly re-check the surroundings.

CITATION LIST

Patent Literature

PTL 1: Japanese Patent Application Laid-Open No. 2009-205191

SUMMARY

Technical Problem

The present disclosure has been made, for example, in view of the problem described above, and it is desirable to provide an information processing apparatus, an information processing method, and a non-transitory computer-readable storage medium capable of generating display data for presenting a space that is available for a vehicle to be parked, for example, in a parking lot to a user who is a vehicle driver in an easy-to-understand manner.

Solution to Problem

According to a first aspect of the present disclosure,
there is provided an information processing apparatus including:
processing circuitry configured to
acquire, by a sensor, feature information about another vehicle in a parking lot,
generate a parking lot map including a vehicle icon corresponding to the another vehicle, wherein the vehicle icon indicates the feature information about the another vehicle, and
display the parking lot map with the vehicle icon.
Further, according to a second aspect of the present disclosure,
there is provided an information processing method executed by an information processing apparatus, the information processing method including:
acquiring, by a sensor, feature information about another vehicle in a parking lot;
generating, by processing circuitry, a parking lot map including a vehicle icon corresponding to the another vehicle, wherein the vehicle icon indicates the feature information about the another vehicle, and
displaying, by the processing circuitry, the parking lot map with the vehicle icon.
Further, according to a third aspect of the present disclosure,
there is provided a program for causing an information processing apparatus to execute information processing including:
acquiring, by a sensor, feature information about another vehicle in a parking lot;
generating, by processing circuitry, a parking lot map including a vehicle icon corresponding to the another vehicle, wherein the vehicle icon indicates the feature information about the another vehicle, and
displaying, by the processing circuitry, the parking lot map with the vehicle icon.
Note that the program according to the present disclosure is, for example, a program that can be provided in a computer-readable format, through a storage medium or a communication medium, to an information processing apparatus, an image processing apparatus, or a computer system capable of executing various program codes. By providing such a program in a computer-readable format, processing is realized according to the program on the information processing apparatus or the computer system.

Other objects, features, and advantages of the present disclosure will become apparent from more detailed description based on the embodiments of the present disclosure to be described below and the accompanying drawings. Note that, in the present specification, the system is a logical set of a plurality of devices, but the devices of the system are not limited to being all contained in the same housing.

According to an embodiment of the present disclosure, by generating and displaying a parking lot map including icons that enable identifying features of various objects in a parking lot, such as parked vehicles and persons, it is possible to quickly determine a location of an actual vehicle or the like with high accuracy.

Specifically, for example, an image processing apparatus includes: processing circuitry configured to acquire feature information about a vehicle or a person in a parking lot, e.g., information on at least one feature among a color, an orientation, a location, a size, a vehicle brand, and a vehicle type, using information detected by a sensor; and generate a parking lot map including an icon corresponding to the vehicle or the person. The icon includes information on at least one feature among a color, an orientation, a location, a size, a vehicle brand, and a vehicle type of an object such as a vehicle and a person.

With this configuration, by generating and displaying a parking lot map including icons corresponding to the vehicle or the person, it is possible to quickly determine a location of an actual vehicle or the like with high accuracy.

Note that the effects described in the present specification are merely exemplary and are not restrictive, and there may be additional effects as well.

BRIEF DESCRIPTION OF DRAWINGS

FIG. 2 is a diagram illustrating an example in which a vehicle to be parked in a parking lot travels.

FIG. 3 is a diagram illustrating an example in which a vehicle to be parked in a parking lot travels.

FIG. 8 is a diagram illustrating a specific example of a vehicle icon which is display data generated by the information processing apparatus of the present disclosure.

FIG. 10 is a diagram illustrating a specific example of display data generated by the information processing apparatus according to the present disclosure and a specific example of a parked vehicle icon display when the features of a parked vehicle in a segmented parking area cannot be analyzed.

FIG. 12 is a diagram illustrating a specific example of display data generated by the information processing apparatus according to the present disclosure.

FIG. 16 is a diagram illustrating a specific example of display data generated by the information processing apparatus according to the present disclosure.

FIG. 19 is a diagram illustrating a specific example of display data generated by the information processing apparatus according to the present disclosure.

FIG. 20 is a diagram illustrating a specific example of display data generated by the information processing apparatus according to the present disclosure.

FIG. 22 is a diagram illustrating a specific example of display data generated by the information processing apparatus according to the present disclosure.

FIG. 24 is a diagram illustrating a specific example of display data generated by the information processing apparatus according to the present disclosure.

FIG. 27 is a flowchart illustrating a sequence of processes executed by the information processing apparatus according to the present disclosure.

FIG. 28 is a flowchart illustrating a sequence of processes executed by the information processing apparatus according to the present disclosure.

FIG. 29 is a diagram illustrating an example of a configuration of the information processing apparatus according to the present disclosure.

DESCRIPTION OF EMBODIMENTS

Hereinafter, an information processing apparatus, an information processing method, and a non-transitory computer-readable storage medium according to the present disclosure will be described in detail with reference to the drawings. Note that the description will be made according to the following items.

1. General Process for Parking Vehicle in Parking Lot and Problems Thereof
2. Process for Presenting Location of Parking-Available Area to User In Easy-to-Understand Manner According to Present Disclosure
3. Specific Example of Parked Vehicle Icon
4. Specific Example of Object Identification Icon Other Than Parked Vehicle Icon
5. Process for Enlarging and Reducing Parking Lot Map
6. Specific Example of Process for Selecting Parking Area from Parking Lot Map and Performing Parking
7. Examples of Various Types of Display Data Displayed on Display Unit of Vehicle
8. Process for Setting Desired Parking Area by User and Automatically Selecting Parking Area Reflecting User's Setting
9. Embodiment in Which Parking Lot Map Is Displayed on Display Unit of User Terminal
10. Sequence of Processes Executed by Information Processing Apparatus According to Present Disclosure
11. Example of Configuration of Information Processing Apparatus According to Present Disclosure
12. Example of Hardware Configuration of Information Processing Apparatus According to Present Disclosure
13. Summary of Configuration of Present Disclosure

1. General Process for Parking Vehicle in Parking Lot and Problems Thereof

First, a general process for parking a vehicle in a parking lot and problems thereof will be described.

An example of general traveling in a case where a vehicle is parked in a parking lot will be described with reference to FIG. 1 and subsequent drawings.

Figure 1:
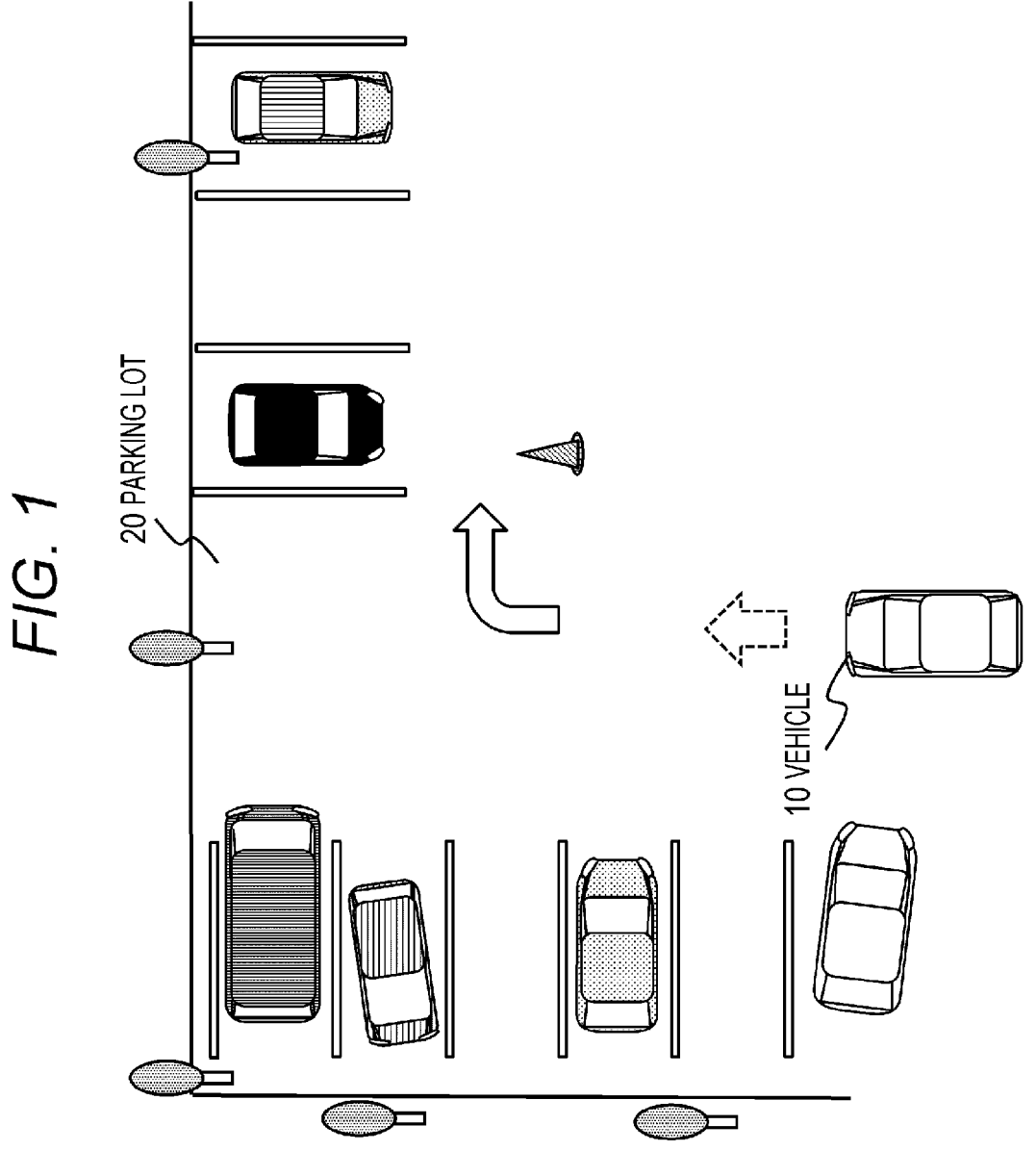
FIG. 1 is a diagram illustrating an example in which a vehicle to be parked in a parking lot travels.

FIG. 1 illustrates a vehicle 10 and a parking lot 20. The vehicle 10 is about to enter the parking lot 20 from an entrance of the parking lot 20 and search for a vacant space to park.

In the state of FIG. 1, a user who is a driver of the vehicle 10 enters the parking lot from the entrance of the parking lot 20 while looking ahead of the vehicle, but it is difficult to check which segmented parking area is vacant at the time of entry.

Figure 2:
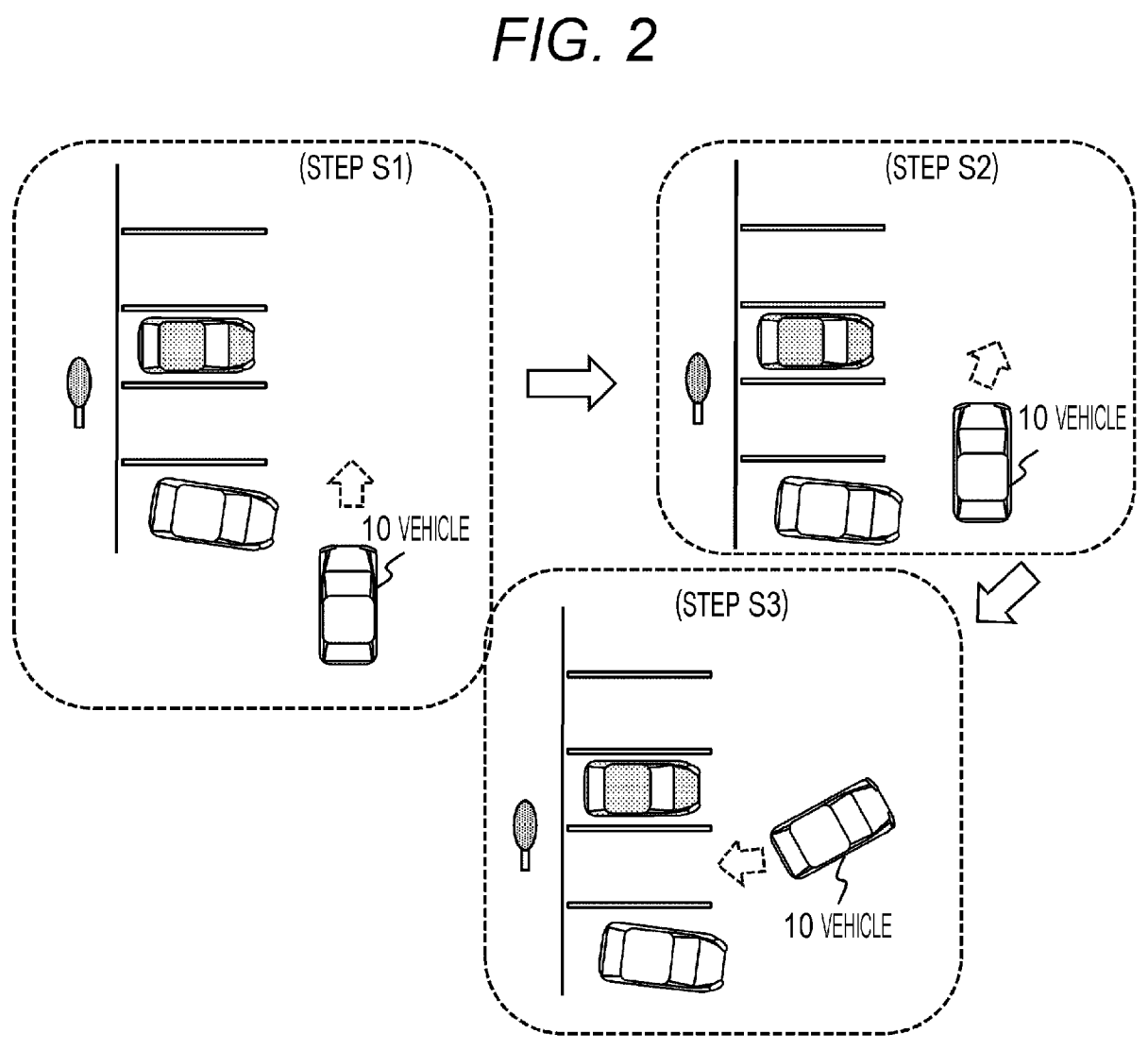

Therefore, the user who is the driver of the vehicle 10 drives the vehicle 10 in the parking lot, for example, in a sequence as illustrated in FIG. 2 and checks a vacant space to park.

First, in (step S1) illustrated in FIG. 2, the vehicle 10 starts traveling from the end of the parking lot 20. At this point of time, it is difficult for the user (driver) to check where is vacant. In order to check where is vacant, the user (driver) drives straight along right sides of left segmented parking areas as shown in (step S2), and sequentially checks whether or not there is a vehicle in each of the left segmented parking areas.

When the vehicle 10 travels straight and reaches the location shown in (step S2), the user (driver) can directly identify a vacant space where there is no vehicle.

As a result, the user (driver) operates a steering wheel at the location of (step S2) to park in the vacant space that is identified directly by the user (driver).

That is, as shown in (step S3), the user (driver) performs a driving operation for parking in the vacant space by driving the vehicle in a forward right direction and then driving the vehicle in a backward direction.

Figure 3:
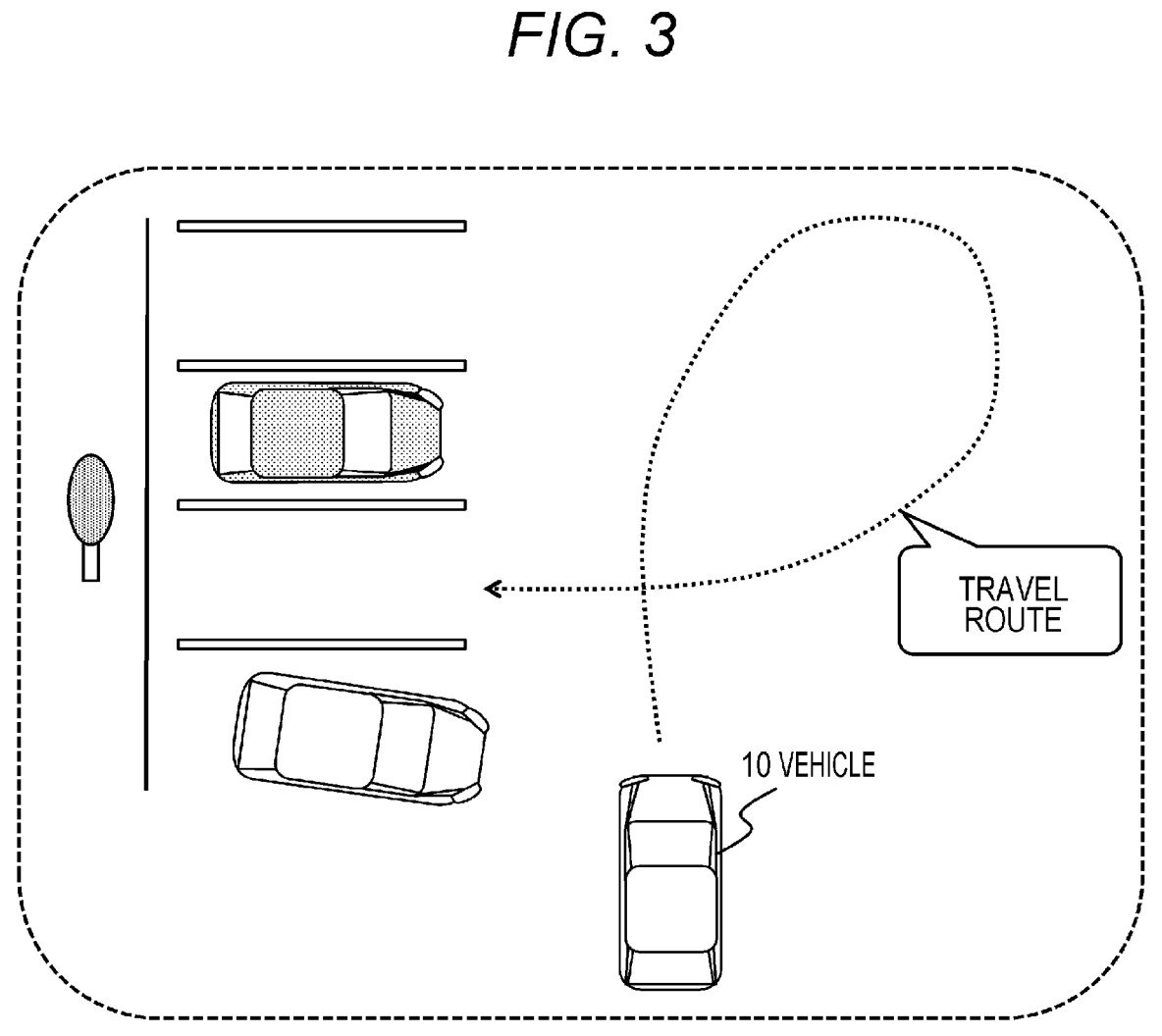

The travel route of the vehicle 10 in this series of steps is a travel route as illustrated in FIG. 3.

In order to check a parking-available area, the vehicle 10 needs to travel in the parking lot to park according to the travel route as illustrated in FIG. 3. Such traveling for checking a vacant space takes time, and traveling in a narrow path of the parking lot is likely to cause a collision with another vehicle or a person, which involves a safety issue.

Note that, even in a case where the vehicle 10 is a vehicle capable of automated driving and automatic parking, a driver usually determines a parking area in which the vehicle is to be parked, and needs to check a vacant area of the parking lot to determine a parking area, which causes a problem similar to what is described above.

Furthermore, a control unit of an automated vehicle may also be configured to detect a vacant parking area by itself such that the vehicle is automatically parked in the detected vacant area. In this case as well, however, an automated driving control unit needs to search for a vacant area available for parking, and the vehicle travels wastefully in the parking lot.

Note that the configuration and processing according to the present disclosure to be described below can be used in any vehicle including a vehicle driven by a user (driver) and an automated vehicle that does not require a user to drive.

2. Process for Presenting Location of Parking-Available Area to User in Easy-to-Understand Manner According to Present Disclosure Next, a process for presenting a location of a parking-available area to a user in an easy-to-understand manner according to the present disclosure will be described.

Figure 4:
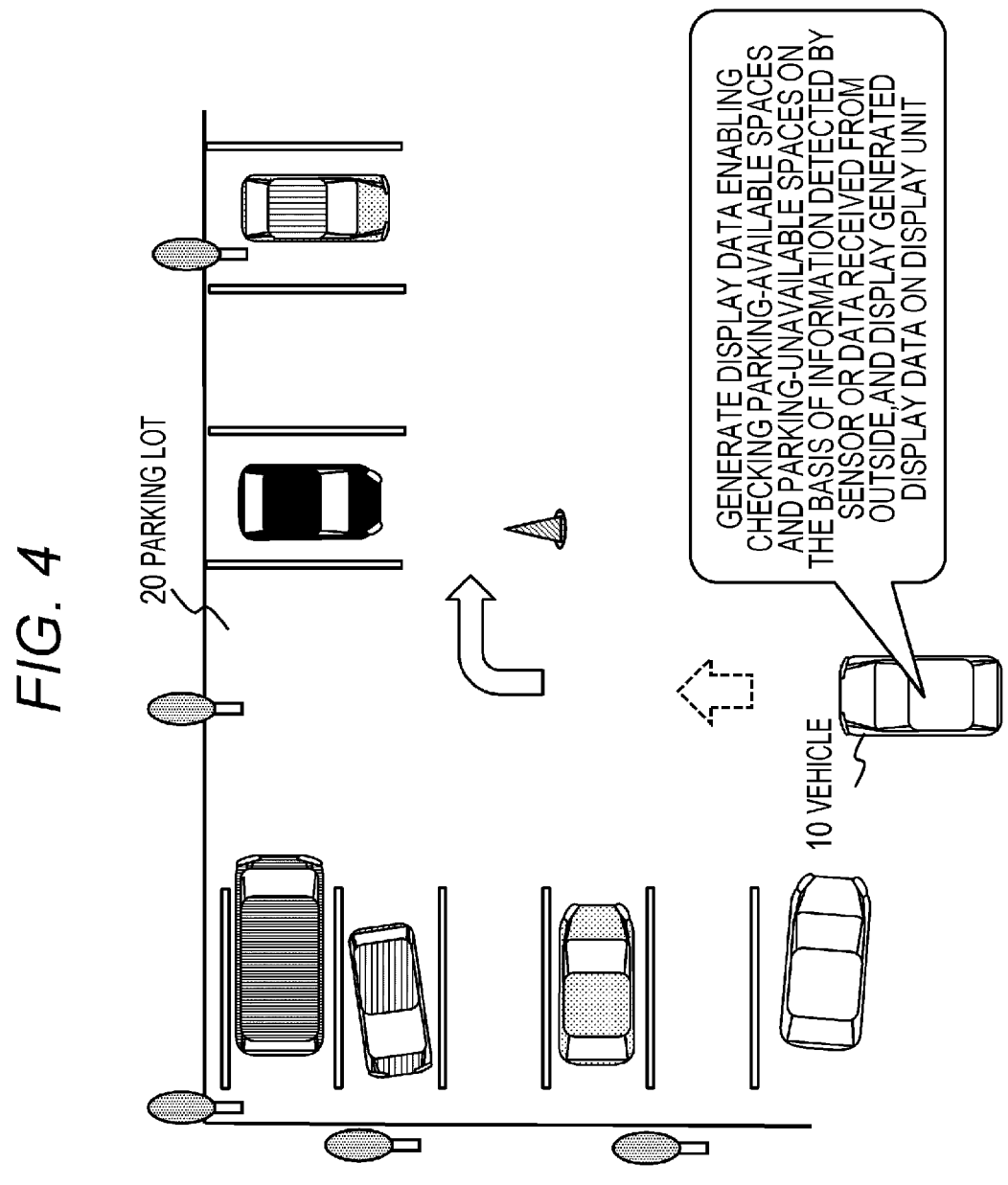
FIG. 4 is a diagram illustrating an example of a process of parking in a parking lot by applying display data generated by an information processing apparatus according to the present disclosure.

FIG. 4 is a diagram similar to FIG. 1 described above. FIG. 4 illustrates a vehicle 10 and a parking lot 20, and the vehicle 10 is about to enter the parking lot 20 from an entrance of the parking lot 20 to be parked in a vacant space.

The vehicle 10 may be either a vehicle driven by a driver (user) or an automated vehicle.

In the state of FIG. 4, even when the user who is the driver of the vehicle 10 looks ahead of the vehicle, it is difficult to directly check which segmented parking area is vacant.

However, an information processing apparatus according to the present disclosure provided in the vehicle 10 analyzes whether each segmented parking area in the parking lot 20 is a parking-available area or a parking-unavailable area where another vehicle is parked on the basis of information detected by a sensor mounted on the vehicle 10 or information received from an external device such as a parking management server, for example.

Moreover, the information processing apparatus according to the present disclosure also analyzes feature information (color, orientation, parked location, size, vehicle brand, vehicle type, etc.) about another vehicle parked in a segmented parking area. Furthermore, the information processing apparatus according to the present disclosure also analyzes feature information (color, location, size, etc.) about each of various objects other than the parked vehicles in the parking lot, for example, a pedestrian, a triangular cone, a plant, an arrow painted on a road surface, drawing information on the road surface such as a crosswalk, and the like.

The information processing apparatus according to the present disclosure generates an identification icon reflecting the feature information about the parked vehicle (an example of another vehicle) or the object other than the parked vehicle in the parking lot, and displays the generated identification icon on a display unit.

The sensor provided in the vehicle 10 is, for example, a sensor such as a camera, a light detection and ranging (LiDAR), a time of flight (ToF) sensor, or a radio detection and ranging (Radar).

Note that the LiDAR or the ToF sensor is a sensor that outputs light such as laser light, for example, and analyzes light reflected by an object to measure a distance from a surrounding object.

Note that the information processing apparatus provided in the vehicle 10 may receive not only the information detected by the sensor but also information on whether or not each segmented parking area in the parking lot 20 is in a vacant state, that is, whether or not each segmented parking area is available, and feature information about a parked vehicle or another object from an external device such as a parking management server, for example.

As described above, the information processing apparatus according to the present disclosure analyzes a situation of a vehicle and another object in the parking lot using at least one of the information detected by the sensor and the information received from the outside.

Specifically, the information processing apparatus according to the present disclosure analyzes whether each segmented parking area in the parking lot 20 is a parking-available area or a parking-unavailable area where a vehicle is parked, and feature information (color, orientation, parked location, size, vehicle brand, vehicle type, etc.) about a parked vehicle and feature information about each of various objects (person, structure, paint, etc.) in the parking lot, generate data including icons corresponding to the parked vehicle and another object on the basis of an analysis result, displays the generated data on the display unit (monitor) in the vehicle 10.

A specific example of display data generated by the information processing apparatus according to the present disclosure will be described with reference to FIG. 5 and subsequent drawings.

Figure 5:
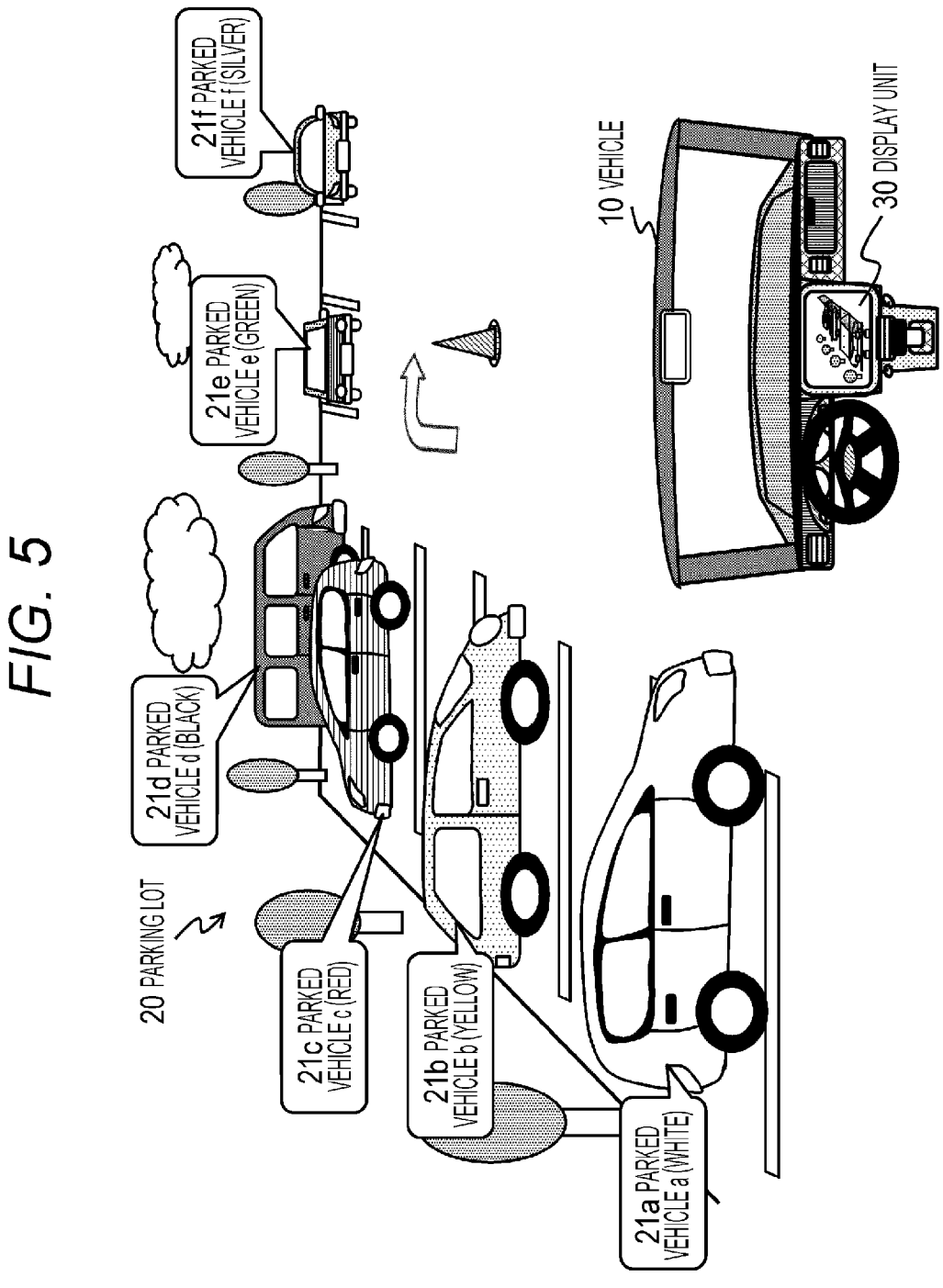
FIG. 5 is a diagram illustrating a specific example of display data generated by the information processing apparatus according to the present disclosure.

FIG. 5 illustrates an example of a front panel of the vehicle 10, which is the interior of the vehicle 10. The display data generated by the information processing apparatus according to the present disclosure is displayed on the display unit 30 included in the front panel of the vehicle 10.

Note that the vehicle 10 illustrated in FIG. 5 corresponds to the vehicle 10 illustrated in FIG. 4, and travels on a travel path of the parking lot 20.

The information processing apparatus provided in the vehicle 10 generates display data that makes it easy to determine whether each segmented parking area in the parking lot 20 is a parking-available area or a parking-unavailable area where a vehicle is parked, and information about the vehicle parked in the parking-unavailable area, such as, for example, color, orientation, location, size, vehicle brand, and vehicle type of the vehicle, on the basis of the information detected by the sensor or the information received from the outside, and displays the generated display data on the display unit.

In the example illustrated in FIG. 5, the following vehicles are parked in the parking lot 20:

parked vehicle a (white) 21a;
parked vehicle b (yellow) 21b;
parked vehicle c (red) 21c;
parked vehicle d (black) 21d,
parked vehicle e (green) 21e; and
parked vehicle f (silver) 21f.

The color indicated in ( ) is a color of each parked vehicle.

Figure 6:
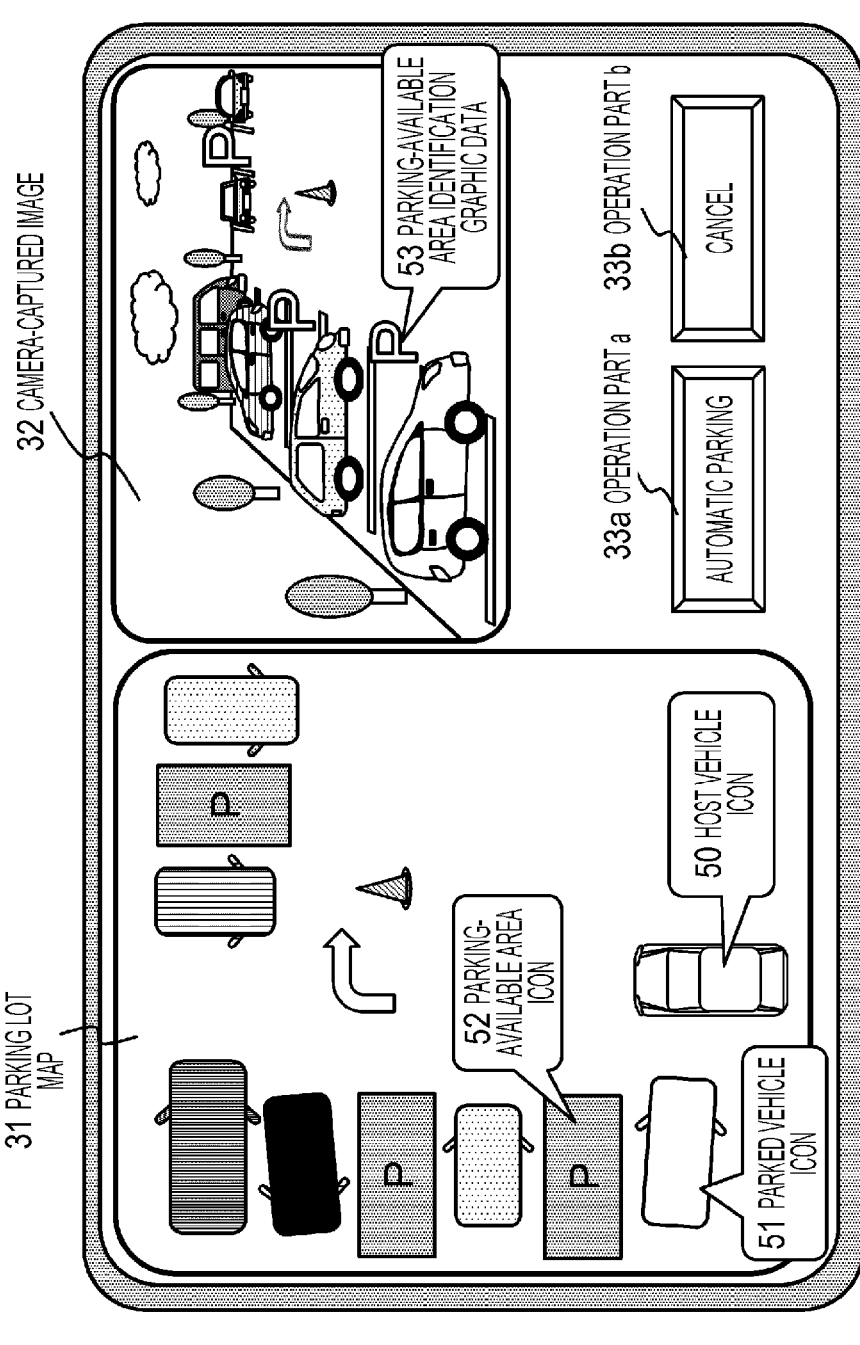
FIG. 6 is a diagram illustrating a specific example of display data generated by the information processing apparatus according to the present disclosure.

FIG. 6 illustrates an example of display data generated by the information processing apparatus according to the present disclosure.

The display data illustrated in FIG. 6 is an example of data displayed on the display unit 30 included in the front panel of the vehicle 10.

The data displayed on the display unit 30 illustrated in FIG. 6 includes the following data:

(a) parking lot map 31;
(b) camera-captured image 32; and
(c) operation part 33

The "(a) parking lot map 31" is a parking lot map generated on the basis of the information detected by the sensor such as a camera provided in the vehicle 10 or the information received from the outside, and is a top view of the parking lot.

The parking lot map 31 displayed on the display unit 30 is data regarding parking areas in front of the vehicle 10 viewed from above, and is a virtual image (animation image) rather than a real image captured by a camera.

The parking areas displayed through "(a) parking lot map 31" are sequentially changed as the vehicle 10 travels. That is, the areas in front of the vehicle 10 are displayed through animation images sequentially changed to virtual images showing the areas in front of the vehicle 10 viewed from above.

In the "(a) parking lot map 31", various icons are displayed as illustrated in the drawing. Specifically, the plurality of icons includes:

a host vehicle icon 50 indicating a host vehicle;
a parked vehicle icon 51 indicating a parked vehicle; and
a parking-available area icon 52 indicating a parking-available area.

A triangular cone and an arrow illustrated in the drawing are not real images but icons corresponding to respective objects.

Note that, in the present specification, the "icon" refers to graphic data for identifying an object type.

The host vehicle icon 50 indicating a host vehicle indicates a host vehicle to be parked. That is, the host vehicle icon 50 corresponds to the vehicle 10 illustrated in FIG. 4.

The parked vehicle icon 51 indicating a parked vehicle is an icon indicating a vehicle parked in each segmented parking area.

The parking-available area icon 52 indicating the parking-available area indicates a segmented parking area where no vehicle is parked, that is, a vacant area available for parking, and is an icon including a letter "P" indicating that parking is possible.

Note that, as will be described in detail below, the information processing apparatus according to the present disclosure generates an icon reflecting feature information (color, orientation, location, size, vehicle brand, and vehicle type) about each parked vehicle as a "parked vehicle icon 51", and displays the generated icon on the display unit 30.

The "(a) parking lot map 31" is generated using at least one of the information detected by the sensor such as a camera provided in the vehicle 10 or the information received from the outside.

Note that the "(a) parking lot map 31" can also be generated, for example, using a learning model or AI analysis.

For example, the learning model is generated by executing a learning process in advance using a large number of images captured by the camera of the vehicle or bird's-eye images generated from the captured images. The learning model is a learning model that detects a segmented parking area, determines whether the segmented parking area is a parking-available area or a parking-unavailable area where a vehicle is parked, and determines a location, an orientation, a color, a size, a vehicle brand, a vehicle type, etc. of the parked vehicle.

The image analysis executed is executed by inputting the images captured by the camera provided in the vehicle 10 to an AI analysis unit using the learning model generated in advance. Through this analysis process, it is possible to acquire whether each segmented parking area is a parking-available area or a parking-unavailable area where a vehicle is parked, and feature information about a vehicle parked in a parking-unavailable area, such as, for example, a color, a location, an orientation, and a size of the vehicle, and it is possible to generate and display an icon on the basis of the acquired information.

Through the AI analysis to which the learning model is applied, it is also possible to acquire feature information (color, location, size, etc.) about each of various objects other than vehicles, including information about, for example, a pedestrian, a triangular cone, a plant, an arrow painted on a road surface, and drawing information on the road surface such as a crosswalk.

Note that the process for acquiring feature information about a vehicle or an object other than the vehicle is not limited to the AI analysis to which the learning model is applied. The feature information can be acquired by analyzing the information detected by the sensor such as a camera mounted on the vehicle 10 or by using the information from the outside such as a parking management server.

The "(b) camera-captured image 32" included in the data displayed on the display unit 30 illustrated in FIG. 6 is an image captured by a camera provided in the vehicle 10. In a case where the shift range of the vehicle 10 is a D range, an image captured by the camera in a forward direction of the vehicle 10 is displayed. In a case where the shift range of the vehicle 10 is an R range, an image captured by the camera in a backward direction of the vehicle 10 is displayed.

Note that, as illustrated in the drawing, various kinds of virtual image data such as parking-available area identification graphic data 53 are displayed in a superimposed manner in a region for displaying the camera-captured image 32.

The "P" illustrated in the drawing is graphic data indicating a segmented parking area that is available for parking in which no vehicle is parked.

The operation part 33 is an operation part that can be operated by a user.

In the example illustrated in the drawing, an operation part a 33a is pressed in a case where the user instructs "automatic parking". The "automatic parking" is a process of causing the vehicle 10 to detect a segmented parking area available for parking in which no vehicle is parked and automatically park in the detected area.

An operation part b 33b is pressed in a case where the user "cancels" the automatic parking.

Note that the operation part 33 includes two operation parts, "automatic parking" as the operation part a 33a and "cancel" as the operation part b 33b, in the example illustrated in the drawing, but not only these two operation parts but also other operation parts are displayed in the region for displaying the operation part 33 in a certain situation.

3. Specific Example of Parked Vehicle Icon

Next, a specific example of a parked vehicle icon will be described.

The parked vehicle icon displayed in the parking lot map 31, which is data displayed on the display unit 30, will be described in detail with reference to FIG. 7.

As described with reference to FIG. 6 above, the following icons are displayed in the "(a) parking lot map 31":

a host vehicle icon 50 indicating a host vehicle;

a parked vehicle icon 51 indicating a parked vehicle; and a parking-available area icon 52 indicating a parking-available area.

As described above, the information processing apparatus according to the present disclosure generates and displays an icon reflecting feature information (color, orientation, location, size, vehicle brand, and vehicle type) about a parked vehicle for the "parked vehicle icon 51".

A specific example thereof will be described with reference to FIG. 7.

Figure 7:
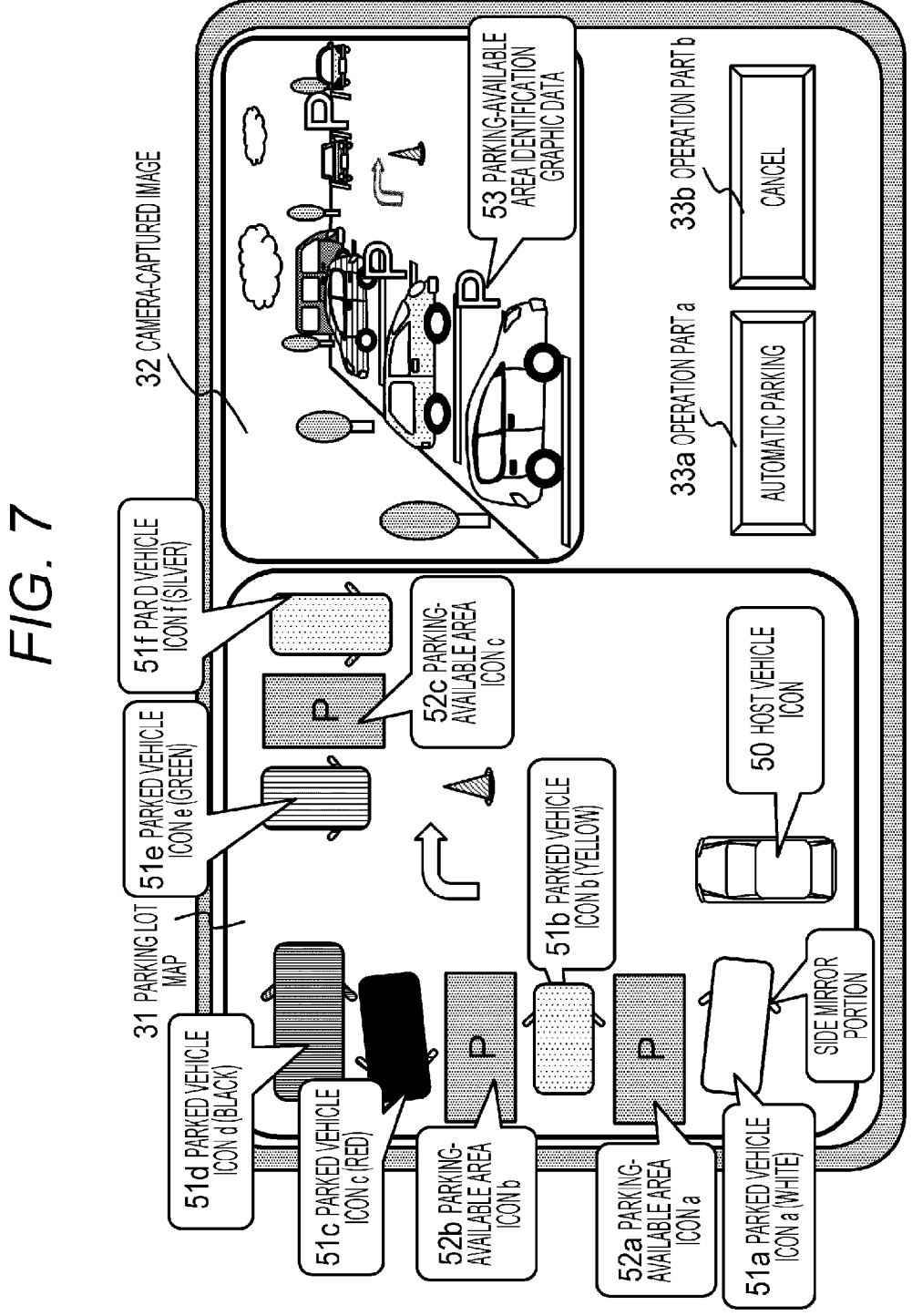
FIG. 7 is a diagram illustrating a specific example of display data generated by the information processing apparatus according to the present disclosure.

In the "parking lot map 31" illustrated in FIG. 7 as data displayed on the display unit 30, a plurality of parked vehicle icons 51a to 51f is displayed.

These parked vehicle icons 51a to 51f are icons corresponding to the parked vehicles in the parking lot 20 illustrated in FIG. 5.

The parked vehicle icon a (white) 51a illustrated in FIG. 7 is an icon indicating the parked vehicle a (white) 21a illustrated in FIG. 5, and is displayed as a white icon having the same color as the color of the actual parked vehicle a (white) 21a illustrated in FIG. 5=white.

The parked vehicle icon b (yellow) 51b illustrated in FIG. 7 is an icon indicating the parked vehicle b (yellow) 21b illustrated in FIG. 5, and is displayed as a yellow icon having substantially the same color as the color of the actual parked vehicle b (yellow) 21b illustrated in FIG. 5=yellow.

The following parked vehicle icons 51c to 51f are displayed in a similar manner.

The parked vehicle icon c (red) 51c illustrated in FIG. 7 is displayed as a red icon having substantially the same color as the parked vehicle c (red) 21c illustrated in FIG. 5.

The parked vehicle icon d (black) 51d is displayed as a black icon similar to the parked vehicle d (black) 21d illustrated in FIG. 5.

The parked vehicle icon e (green) 51e is displayed as a green icon having substantially the same color as the parked vehicle e (green) 21e illustrated in FIG. 5.

The parked vehicle icon f (silver) 51f is displayed as a silver icon having substantially the same color as the parked vehicle f (silver) 21f illustrated in FIG. 5.

In this way, the information processing apparatus according to the present disclosure generates and displays an icon having substantially the same color as a color of an actual parked vehicle for the parked vehicle icon.

Furthermore, the information processing apparatus according to the present disclosure generates and displays a parked vehicle icon enabling identifying an orientation of a vehicle.

The parked vehicle icon illustrated in FIG. 7 is a rectangular icon having protrusions indicating side mirrors, and the side on which the protrusions indicating side mirror portions are set in a length direction of the rectangular icon is a front side of the vehicle.

The orientation of the vehicle indicated by the parked vehicle icon is set to be the same as the orientation of the actual parked vehicle.

For example, the parked vehicle icon a 51*a* and the parked vehicle icon b 51*b* illustrated in FIG. 7 indicate that the vehicles are parked in the respective segmented parking areas in such a manner that the front sides of the vehicles face the travel path.

These orientations are the same as the orientations of the actual parked vehicles illustrated in FIG. 5, that is, the parked vehicle a (white) 21*a* and the parked vehicle b (yellow) 21*b*.

On the other hand, for example, the parked vehicle icon c 51*c* illustrated in FIG. 7 indicate that the vehicle is parked in the segmented parking area in such a manner that the rear side of the vehicle faces the travel path. This orientation is the same as the orientation of the actual parked vehicle illustrated in FIG. 5, i.e. the parked vehicle c (red) 21*c*.

In this way, the information processing apparatus according to the present disclosure generates and displays a parked vehicle icon enabling identifying an orientation of a vehicle.

Moreover, the information processing apparatus according to the present disclosure performs a process for displaying a vehicle icon reflecting a parked location and a vehicle size of an actual parked vehicle.
The display locations and icon sizes of the parked vehicle icons 51*c* to 51*f* illustrated in FIG. 7 reflect the parked locations and vehicle sizes of the actual parked vehicles.

For example, the parked vehicle icon a 51*a* illustrated in FIG. 7 are displayed obliquely with respect to the parking area. This indicates that the actual parked vehicle in this segmented parking area is parked obliquely.

The parked vehicle icon b 51*b* is an icon smaller in size than the other vehicle icons, indicating that the actual parked vehicle in this segmented parking area is a small-size vehicle.

The parked vehicle icon c 51*c* is oriented in the opposite direction to the other vehicle icons, and displayed obliquely with respect to the parking area. This indicates that the actual parked vehicle in this segmented parking area is parked in the opposite direction different from the other vehicles, and is parked obliquely with respect to the segmented parking area.

The parked vehicle icon d 51*d* is displayed as an icon larger in size than the other vehicle icons. This indicates that the actual parked vehicle in this segmented parking area is a large-size vehicle. Furthermore, although not illustrated, the parked vehicle icon 51 may be displayed with an emblem of a brand corresponding to an identified vehicle type.

As described above, the information processing apparatus according to the present disclosure generates and displays a vehicle icon enabling identifying features of a parked vehicle such as a color, an orientation, a parked location, a size, a vehicle brand, and a vehicle type of an actual parked vehicle. Note that the information processing apparatus according to the present disclosure may generate and display an icon reflecting at least one piece of feature information among a plurality of pieces of feature information (color, orientation, location, size, vehicle brand, and vehicle type) about a parked vehicle.

Note that a rectangular icon having protrusions indicating side mirrors is used to enable identifying an orientation of a vehicle in the example illustrated in FIG. 7, but an icon enabling identifying an orientation of a vehicle is not limited to this example, and can be set in various ways.

An example of an icon enabling identifying an orientation of a vehicle will be described with reference to FIG. 8.

FIG. 8(1) illustrates an example using a rectangular icon having protrusions indicating side mirrors, which has been described with reference to FIG. 7. The side on which the protrusions indicating side mirror portions are set in the length direction of the rectangular icon is a front side of the vehicle.

FIG. 8(2) illustrates an example using an icon having elliptical portions indicating headlights. The side having the elliptical portions indicating headlights in the length direction of the rectangular icon is a front side of the vehicle.
FIG. 8(3) illustrates an example using an icon having a trapezoidal portion indicating a windshield.
The side having the trapezoidal portion indicating a windshield in the length direction of the rectangular icon is a front side of the vehicle.

FIG. 8(4) illustrates an example using an icon having all of the components (1) to (3), that is, side mirrors, headlights, and a windshield.

FIG. 8(5) illustrates an example using a triangular identification mark for indicating a front side of a vehicle. The side on which the identification mark is displayed is the front side of the vehicle.

As described above, an icon enabling identifying an orientation of a vehicle can be set in various ways.

As described above, the information processing apparatus according to the present disclosure generates an icon reflecting feature information (color, orientation, location, and size) about an actual parked vehicle for the "parked vehicle icon 51", and displays the generated icon on the display unit 30.

A user of a vehicle, such as a driver, can easily associate a "parked vehicle icon 51" displayed on the display unit 30 with an actual vehicle visible from the vehicle 10.

As a result, it is possible to immediately find out an actual location of a segmented parking area where a parking-available area icon 52 is displayed, and for example, it is possible to determine a target parking area in a short time.

Note that, for example, in a case where a segmented parking area is far away from the vehicle 10, or in a case where a segmented parking area is hidden by a parked vehicle in front of a vehicle parked in the segmented parking area, or the like, it may not be possible to analyze features, such as a color, a shape, and an orientation, of the vehicle parked in the segmented parking area through image analysis processing based on a camera-captured image of the vehicle 10. Specifically, for example, although it can be confirmed that there is a vehicle parked in the segmented parking area, it may not be possible to specify features (color, orientation, location, size, vehicle type, vehicle brand and the like) of the parked vehicle.

In such a case where the features of the vehicle parked in the segmented parking area is unclear, the information processing apparatus according to the present disclosure first displays a "parked vehicle icon 51" that does not reflect feature information (color, orientation, location, size, vehicle type, vehicle brand and the like). Thereafter, at a time point when the vehicle 10 approaches the segmented parking area such that the features of the parked vehicle become clear, the "parked vehicle icon 51" is switched to reflect feature information (color, orientation, location, size, vehicle type, vehicle brand and the like).

A specific example of a process of switching the parked vehicle icon 51 and displaying the switched parked vehicle icon 51 will be described with reference to FIG. 9.

Figure 9:
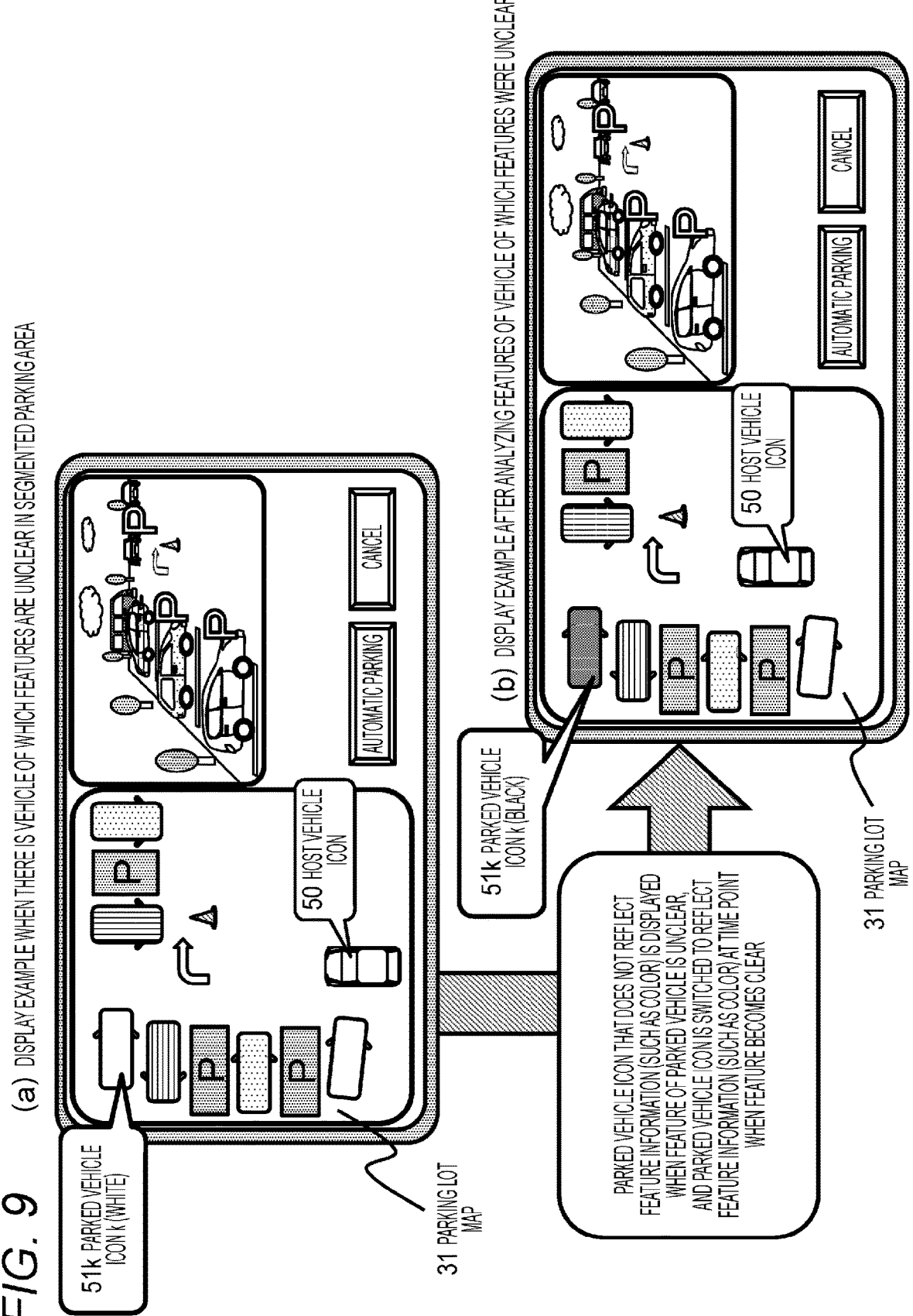
FIG. 9 is a diagram illustrating a specific example of display data generated by the information processing apparatus according to the present disclosure and a specific example of a parked vehicle icon display when the features of a parked vehicle in a segmented parking area cannot be analyzed.

FIG. 9 illustrates the following two display examples as an example of a process of switching a display of a parking lot map 31 in a case where there is a vehicle of which features are unclear in a segmented parking area.

(a) a display example in which a parking lot map 31 is displayed in a case where there is a vehicle of which features are unclear in a segmented parking area (b) a display example in which a parking lot map 31 is displayed after analyzing the features of the vehicle of which the features were unclear.

In (a) of FIG. 9, the segmented parking area at the upper left end of the parking lot map 31 illustrated in the drawing is far away from the vehicle 10 that is a host vehicle, in a state where it can be confirmed that there is a vehicle parked in the upper-left-end segmented parking area through image analysis processing based on a camera-captured image of the vehicle 10, but it is difficult to analyze the features, such as a color, of the parked vehicle.

In this case, the information processing apparatus according to the present disclosure generates a parked vehicle icon k 51k that does not reflect feature information (color, orientation, location, size, vehicle type, vehicle brand and the like) of an actual parked vehicle, and displays the generated parked vehicle icon k 51k on the display unit 30.

In the example illustrated in the drawing, the parked vehicle icon k 51k is an icon set to white.

However, the setting to white is an example, and the parked vehicle icon k 51k may be set to another color.

Thereafter, when the vehicle 10 moves and succeeds in analyzing at least one of the features of the vehicle parked in the upper-left-end segmented parking area, e.g., a color of the vehicle, from a camera-captured image of the vehicle 10, the parked vehicle icon k 51k is switched and displayed to reflect the color of the vehicle, which is an analyzed feature, as illustrated in the lower right part (b) of FIG. 9.

The parked vehicle icon k 51k illustrated in the lower right part (b) of FIG. 9 is a black parked vehicle icon k 51k reflecting a color, which is one of the features of the vehicle parked in the segmented parking area at the upper left end of the parking lot map 31.

As described above, at a time point when it is difficult to analyze features of a vehicle parked in a segmented parking area, the information processing apparatus according to the present disclosure displays a parked vehicle icon that does not reflect the features (color, orientation, location, size, vehicle type, vehicle brand and the like) of the vehicle on the display unit 30.

Thereafter, at a time point when any of the features of the vehicle parked in the segmented parking area can be analyzed, the parked vehicle icon displayed on the display unit 30 is switched to display a parked vehicle icon reflecting the analyzed feature (any of color, orientation, location, size, vehicle type, vehicle brand and the like) of the vehicle.

Note that, in the example illustrated in FIG. 9, the parked vehicle icon k 51k when it is difficult to analyze the color, which is a feature of the parked vehicle, is set to white, but this is an example, and the icon can be set to another color.

For example, in an example illustrated in FIG. 10, at a time point when it is difficult to analyze the color, which is a feature of the parked vehicle, the parked vehicle icon k 51k is transparent to display only dots (a dotted line) indicating the outline of the vehicle.

Moreover, the dots (the dotted line) may be set to blink.

Also in the example illustrated in FIG. 10, thereafter, at a time point when the features of the vehicle parked in the segmented parking area can be analyzed, the parked vehicle icon displayed on the display unit 30 is switched to display a parked vehicle icon reflecting the features (color, orientation, location, size, vehicle type, vehicle brand and the like) of the vehicle.

Moreover, in order for the user such as the driver of the vehicle to understand what feature is unclear among the features (color, orientation, location, size, vehicle type, vehicle brand and the like) of the vehicle parked in the segmented parking area, a display mode may be changed according to the type of the unclear feature.

A specific example thereof will be described with reference to FIG. 11.

Figure 11:
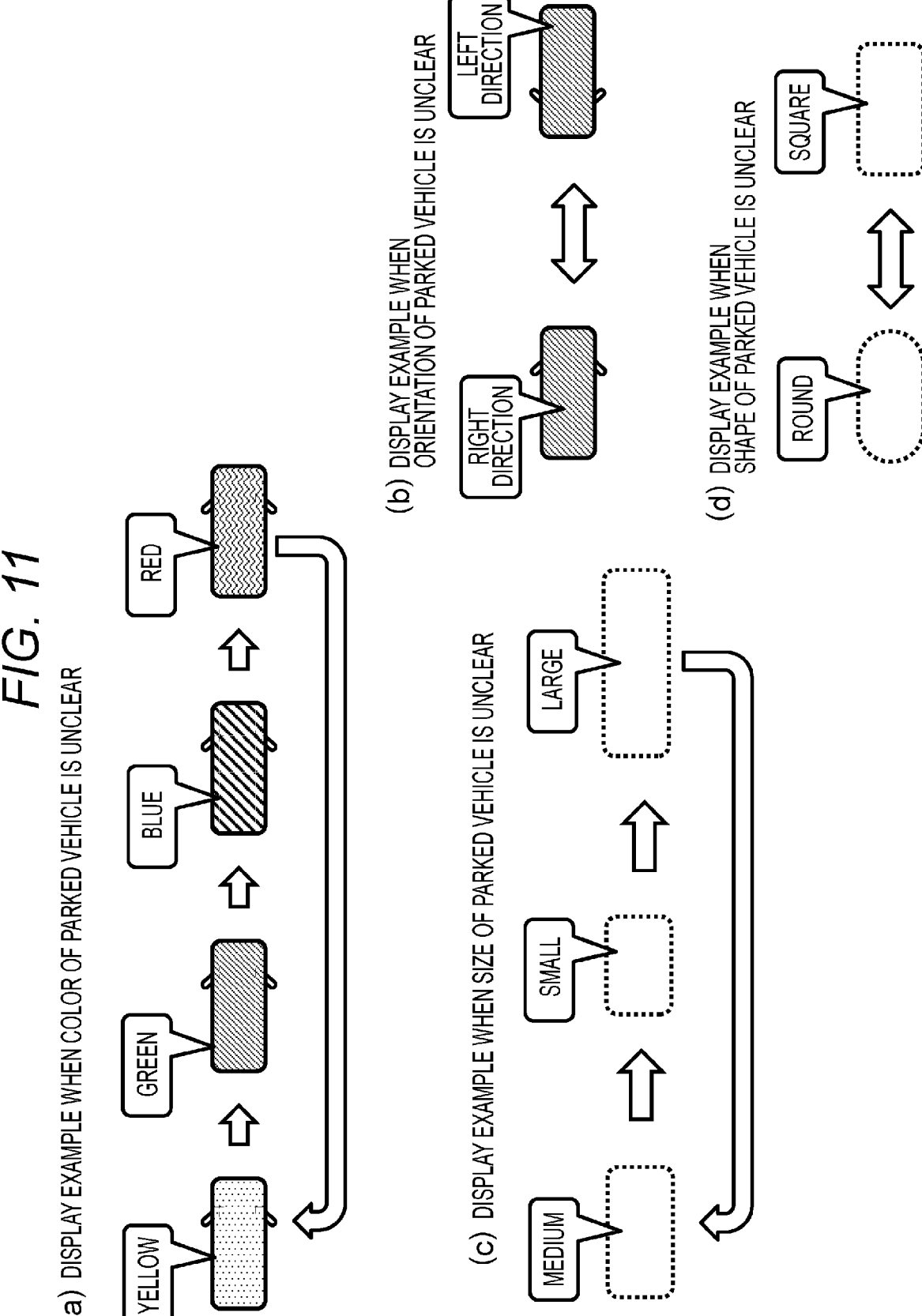
FIG. 11 is a diagram illustrating a specific example of display data generated by the information processing apparatus according to the present disclosure and a specific example of a parked vehicle icon display when the features of a parked vehicle in a segmented parking area cannot be analyzed.

FIG. 11 illustrates the following display examples.

(a) a display example when the color of the parked vehicle is unclear (b) a display example when the orientation of the parked vehicle is unclear (c) a display example when the size of the parked vehicle is unclear (d) a display example when the shape of the parked vehicle is unclear The "(a) display example when the color of the parked vehicle is unclear" is an example in which the parked vehicle icon in the segmented parking area is displayed with its color being consecutively changed. For example, the parked vehicle icon is displayed with its color being consecutively changed in the order of yellow→green→blue→red→yellow, and the like.

By performing such display, the user such as the driver of the vehicle can cognize that it is difficult to analyze the color of the vehicle parked in the specific segmented parking area.

When the color of the parked vehicle is successfully analyzed, the change in color of the parked vehicle icon is stopped, and the parked vehicle icon is displayed fixedly with the analyzed color.

The "(b) display example when the orientation of the parked vehicle is unclear" is an example in which the parked vehicle icon in the segmented parking area is displayed with its orientation being consecutively changed. For example, the parked vehicle icon is displayed with its orientation being changed to left and right alternately.

By performing such display, the user such as the driver of the vehicle can cognize that it is difficult to analyze the orientation of the vehicle parked in the specific segmented parking area.

When the orientation of the parked vehicle is successfully analyzed, the change in orientation of the parked vehicle icon is stopped, and the parked vehicle icon is displayed fixedly with the analyzed orientation.

The "(c) display example when the size of the parked vehicle is unclear" is an example in which the parked vehicle icon in the segmented parking area is displayed with its size being consecutively changed. For example, the parked vehicle icon is displayed with its size being consecutively changed in the order of small→medium→large→small, and the like.

By performing such display, the user such as the driver of the vehicle can cognize that it is difficult to analyze the size of the vehicle parked in the specific segmented parking area.

When the size of the parked vehicle is successfully analyzed, the change in size of the parked vehicle icon is stopped, and the parked vehicle icon is displayed fixedly with the analyzed size.

The "(d) display example when the shape of the parked vehicle is unclear" is an example in which the parked vehicle icon in the segmented parking area is displayed with its shape being consecutively changed. For example, the parked vehicle icon is displayed with its shape being consecutively changed in the order of round→square→round, and the like.

By performing such display, the user such as the driver of the vehicle can cognize that it is difficult to analyze the shape of the vehicle parked in the specific segmented parking area.

When the shape of the parked vehicle is successfully analyzed, the change in shape of the parked vehicle icon is stopped, and the parked vehicle icon is displayed fixedly with the analyzed shape.

Note that, when a plurality of features of the parked vehicle are not analyzed, the display modes (a) to (d) illustrated in FIG. 11 are displayed in combination.

By performing such processing, the user such as the driver of the vehicle can cognize what feature of the vehicle parked in the specific segmented parking area is difficult to be analyzed.

4. Specific Example of Object Identification Icon Other than Parked Vehicle Icon Next, a specific example of an object identification icon other than the parked vehicle icon will be described.

As described above, the information processing apparatus according to the present disclosure also analyzes feature information (color, location, size, etc.) about each of various objects other than the parked vehicles in the parking lot, for example, a pedestrian, a triangular cone, a plant, an arrow painted on a road surface, drawing information on the road surface such as a crosswalk, and the like, generates an identification icon reflecting the feature information, and displays the generated identification icon on the display unit.

First, a specific example of a process for identifying a person such as a pedestrian in the parking lot, analyzing feature information (color, location, size, etc.) about the identified person, generating a person identification icon reflecting the feature information, and displaying the person identification icon on the display unit 30 will be described with reference to FIGS. 12 and 13.

Similarly to FIG. 5 described above, FIG. 12 illustrates a front panel of the vehicle 10 to be parked in a parking area of the parking lot 20. The vehicle 10 illustrated in FIG. 12 corresponds to the vehicle 10 illustrated in FIG. 4, and travels on a travel path of the parking lot 20.

There are two pedestrians in front of the vehicle 10.

The pedestrian a 23a is a pedestrian wearing red clothes. In addition, the pedestrian b 23b is a pedestrian wearing green clothes.

As described above, the information processing apparatus according to the present disclosure also analyzes feature information (color, location, size, etc.) about a pedestrian, generates an identification icon reflecting the feature information, and displays the identification icon on the display unit.

As described above, the information processing apparatus according to the present disclosure acquires feature information (color, location, size, etc.) about a vehicle or an object other than the vehicle, such as a pedestrian, on the basis of information detected by the sensor such as a camera provided in the vehicle 10 or information received from the outside. Alternatively, the feature information is acquired by AI analysis using a learning model generated in advance.

The information processing apparatus according to the present disclosure analyzes feature information (color, location, size, etc.) about an object such as a pedestrian, generates an identification icon reflecting the feature information, and displays the identification icon on the display unit 30 of the vehicle 10.

Figure 13:
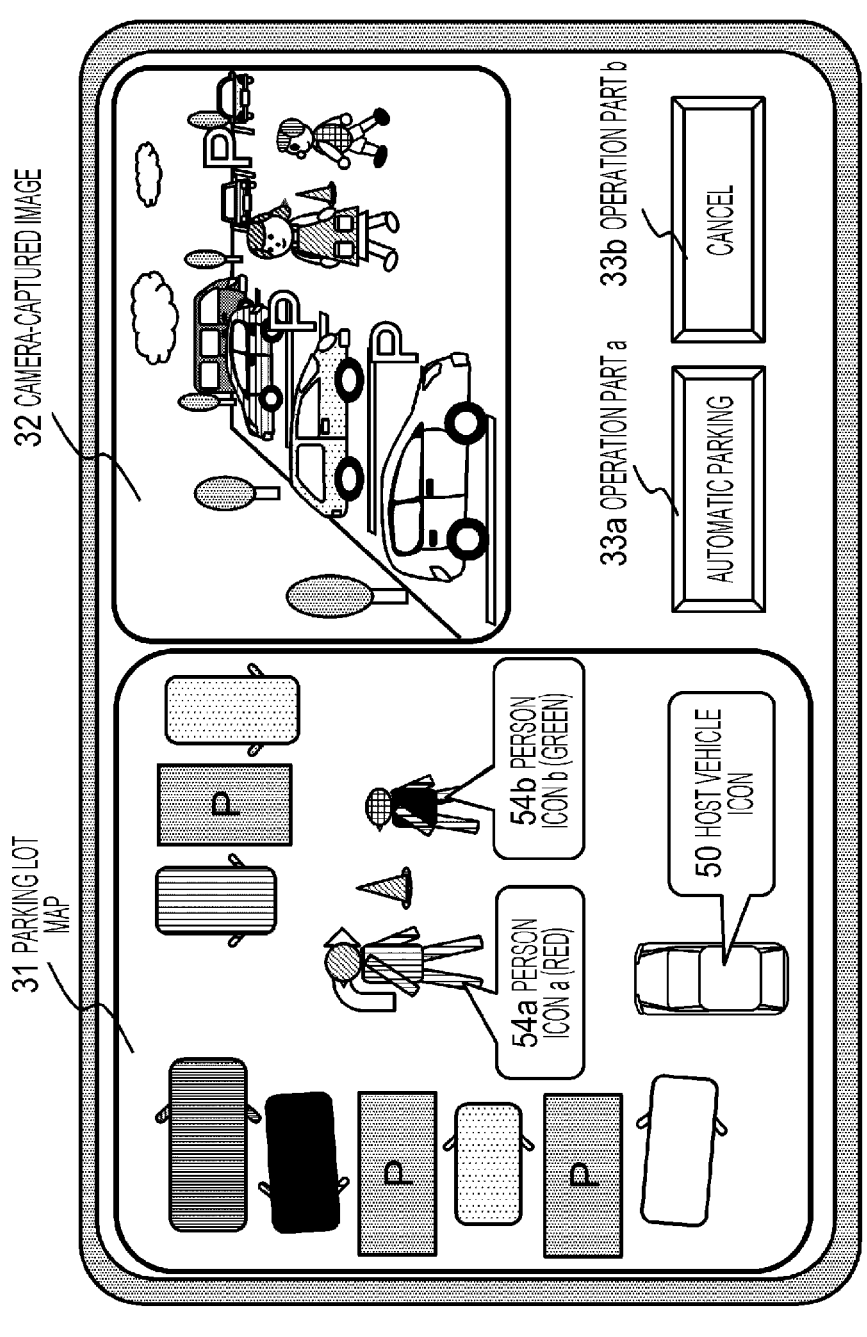
FIG. 13 is a diagram illustrating a specific example of display data generated by the information processing apparatus according to the present disclosure.

FIG. 13 is an example of data displayed on the display unit 30, and is an example in which a person icon is displayed in the parking lot map 31.

A person icon a (red) 54a shown in the parking lot map 31 of FIG. 13 is an icon having a person shape in red. Furthermore, a person icon b (green) 54b is an icon having a person shape in green.

Figure 12:
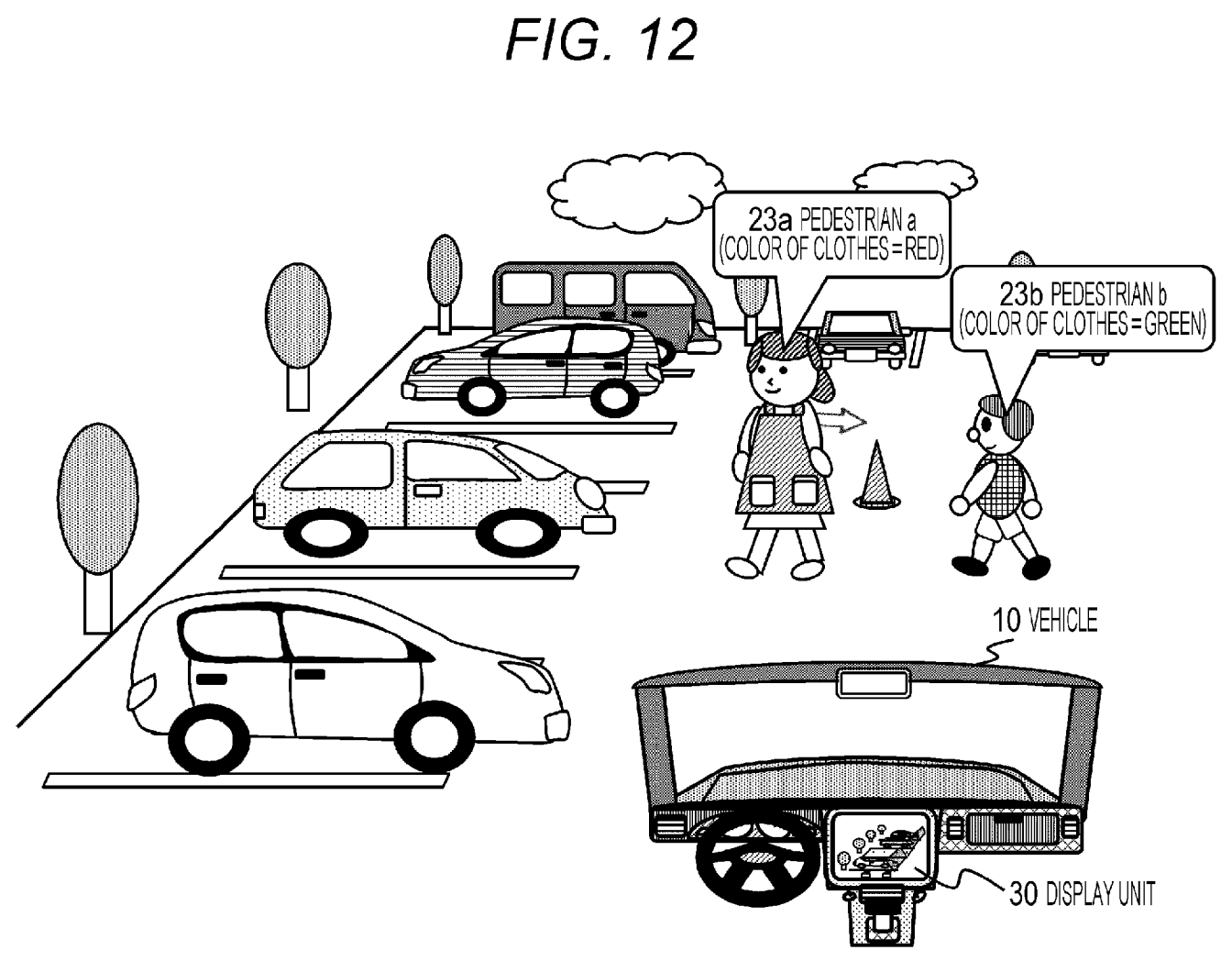

The person icon a (red) 54a in the parking lot map 31 illustrated in FIG. 13 is an icon indicating the adult pedestrian a 23a wearing red clothes, who is an actual pedestrian in the parking lot illustrated in FIG. 12.

In addition, the person icon b (green) 54b in the parking lot map 31 illustrated in FIG. 13 is an icon indicating the small child pedestrian b 23b wearing green clothes, who is an actual pedestrian in the parking lot illustrated in FIG. 12.

In this way, for a person such as a pedestrian, the information processing apparatus according to the present disclosure generates and displays a person-shaped icon having a color similar to a color of clothes of an actual person, similarly to the parked vehicle icon.

Note that, in a case where an orientation and a size of a person can also be analyzed, an icon reflecting the orientation and size of the actual person is generated and displayed on the display unit 30.

In this way, by displaying a person icon of which a color, an orientation, and a size are set to match a color of clothes, an orientation, and a size of an actual person, a user of a vehicle, such as a driver, can easily associate a "person icon 54" displayed on the display unit 30 with an actual person visible from the vehicle 10.

As a result, in a case where a person icon 54 is displayed on the display unit 30, it is possible to immediately determine a location of an actual person outside the vehicle from a positional relationship with the host vehicle icon 50, and accordingly, it is possible to immediately avoid dangerous driving such as approaching a pedestrian.

As described above, the information processing apparatus according to the present disclosure also analyzes feature information (color, location, size, etc.) about each of various objects other than the parked vehicles in the parking lot, for example, a pedestrian, a triangular cone, a plant, an arrow painted on a road surface, drawing information on the road surface such as a crosswalk, and the like, generates an identification icon reflecting the feature information, and displays the generated identification icon on the display unit.

Next, a specific example of a process for identifying another type of object in the parking lot, analyzing feature information (color, location, size, etc.) about the identified object, generating an object icon reflecting the feature information, and displaying the object icon on the display unit 30 will be described with reference to FIGS. 14 and 15.

Similarly to FIGS. 5 and 12 described above, FIG. 14 illustrates a front panel of the vehicle 10 to be parked in a parking area of the parking lot 20. The vehicle 10 illustrated in FIG. 14 corresponds to the vehicle 10 illustrated in FIG. 4, and travels on a travel path of the parking lot 20.

In front of the vehicle 10, a triangular cone (red) 24a placed on the travel path, a crosswalk (white) 24b painted on the travel path, and a guide arrow (white) 24c are visible.

The triangular cone (red) 24a is a red triangular cone. In addition, the crosswalk (white) 24b and the guide arrow (white) 24c are drawn by white paint.

As described above, the information processing apparatus according to the present disclosure also analyzes feature information (color, location, size, etc.) about each of these various types of objects, generates an identification icon reflecting the feature information, and displays the identification icon on the display unit.

As described above, the information processing apparatus according to the present disclosure acquires feature information (color, location, size, etc.) about each of the various objects, on the basis of information detected by the sensor such as a camera provided in the vehicle 10 or information received from the outside. Alternatively, the feature information is acquired by AI analysis using a learning model generated in advance.

The information processing apparatus according to the present disclosure analyzes feature information (color, location, size, etc.) about each of the various objects, generates an identification icon reflecting the feature information, and displays the identification icon on the display unit 30 of the vehicle 10.

Figure 15:
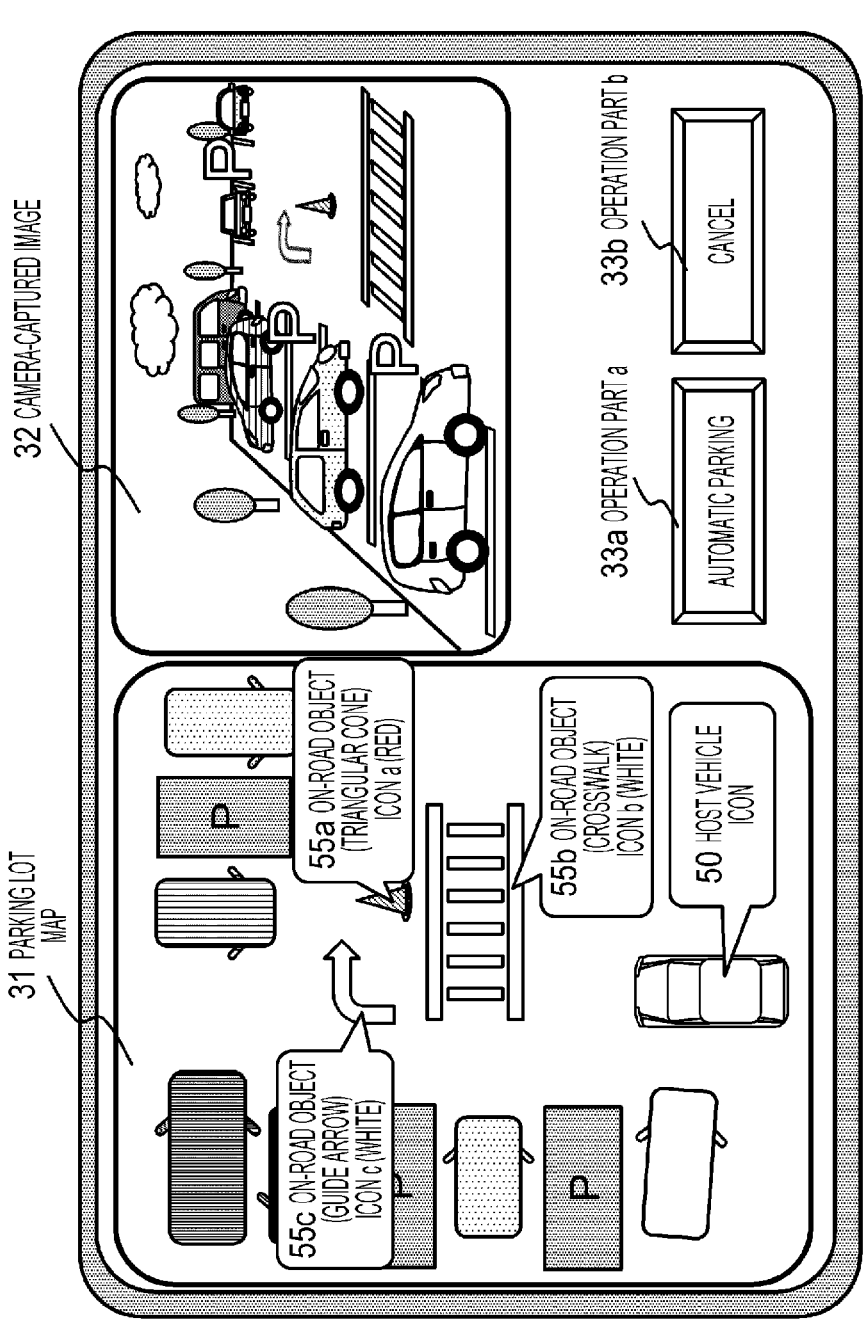
FIG. 15 is a diagram illustrating a specific example of display data generated by the information processing apparatus according to the present disclosure.

FIG. 15 is an example of data displayed on the display unit 30, and is an example in which an on-road object icon 55 is displayed in the parking lot map 31.

An on-road object (triangular cone) icon a (red) 55a shown in the parking lot map 31 of FIG. 15 is an icon having a triangular cone shape in red.

In addition, an on-road object (crosswalk) icon b (white) 55b shown in the parking lot map 31 is an icon having a crosswalk shape in white.

An on-road object (guide arrow) icon c (white) 55c is an icon having an arrow shape in white.

Figure 14:
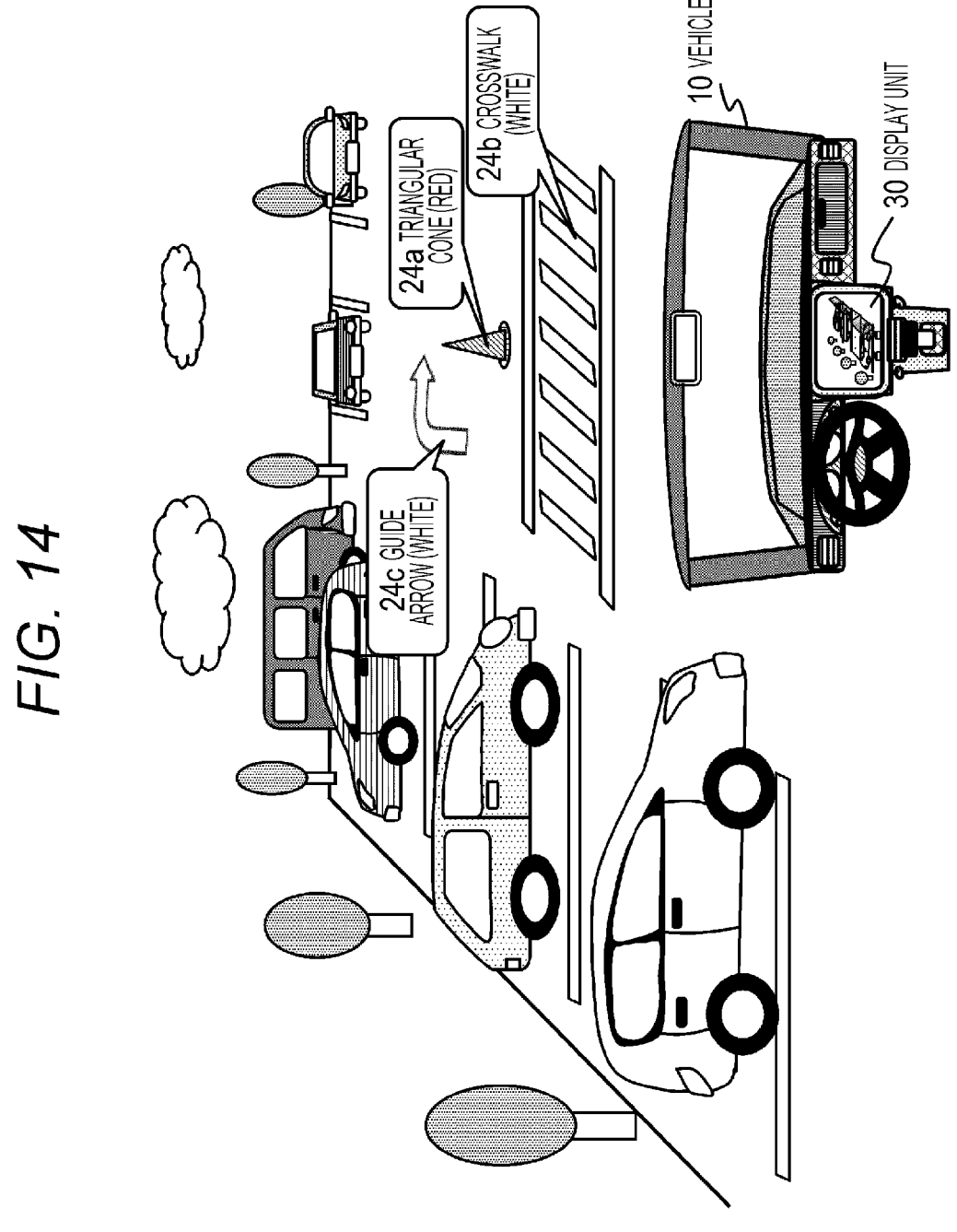
FIG. 14 is a diagram illustrating a specific example of display data generated by the information processing apparatus according to the present disclosure.

These icons are icons reflecting locations and colors of actual objects in the parking lot 20 illustrated in FIG. 14, that is, the triangular cone (red) 24a, the crosswalk (white) 24b, and the guide arrow (white) 24c, respectively.

In this way, for each of various objects other than vehicles and pedestrians, the information processing apparatus according to the present disclosure also generates and displays an icon having a color similar to a color of an actual object, similarly to the parked vehicle icon and the like.

By displaying an icon of which a color is set to match a color of an actual object is set on the display unit 30, a user of a vehicle, such as a driver, can easily associate an "on-road object icon 55" displayed on the display unit 30 with each of the various actual objects visible from the vehicle 10.

As a result, the user can immediately determine a positional relationship between a location of the user's own vehicle 10 and each of the various objects, thereby accurately determining the location of the vehicle 10 in the parking lot 20, leading to smooth driving and parking.

5. Process for Enlarging and Reducing Parking Lot Map

Next, a process for enlarging and reducing a parking lot map will be described.

As described above, the following data is displayed on the display unit 30 of the vehicle 10:

(a) parking lot map 31;

(b) camera-captured image 32; and (c) operation part 33

As described above, the parking areas displayed through "(a) parking lot map 31" are sequentially changed as the vehicle 10 travels. That is, the areas in front of the vehicle 10 are displayed through animation images sequentially changed to virtual images showing the areas in front of the vehicle 10 viewed from above.

Moreover, as illustrated in FIG. 16, the "(a) parking lot map 31" can be enlarged and reduced by a user operation.

The user operation is, for example, a user's pinch-out operation, a user's pinch-in operation, or the like, and the parking lot map 31 can be enlarged or reduced by placing two fingers on the parking lot map 31 displayed on the display unit 30 and spreading out the two fingers for the pinch-out operation or by placing two fingers on the parking lot map 31 displayed on the display unit 30 and narrowing the two fingers for the pinch-in operation.

Note that, in a reduced image of the parking lot map illustrated in FIG. 16(b), information regarding a route along which the vehicle 10 has traveled in the past, that is, host vehicle travel route information 56, is displayed.

As described above, the information processing apparatus according to the present disclosure performs animation display in which the parking lot map is displayed in a sequentially updated manner as the vehicle travels.

Image frames of the parking lot map displayed in the past are sequentially stored in a storage unit in the information processing apparatus. Moreover, in each of the stored image frames, location information about the host vehicle is recorded as attribute information (metadata).

The information processing apparatus combines the image frames of the parking lot map stored in the storage unit to generate a wide-area parking lot map which is a map image for a wide parking lot area as illustrated in FIG. 16(b). Further, by connecting the locations of the host vehicle recorded as the attribute information (metadata) in the respective image frames, the host vehicle travel route information 56 as illustrated in FIG. 16(b) is generated and displayed on the wide-area parking lot map.

The user can check a wide-area parking lot map, which is a map image for a wide parking lot area as illustrated in FIG. 16(b), at any time, thereby making it possible to select a parking area desired by the user from among parking areas in a wider range.

6. Specific Example of Process for Selecting Parking Area from Parking Lot Map and Performing Parking Next, a specific example of a process for selecting a parking area from a parking lot map and performing parking will be described.

Note that, as described above, the configuration and processing according to the present disclosure can be used in any vehicle regardless of whether the vehicle 10 is a vehicle driven by a user or an automated vehicle.

A specific example of a process for selecting a parking area in which the vehicle 10 is to be parked from the parking lot map 31 displayed on the display unit 30 of the vehicle 10 and a process for parking the vehicle 10 in the selected parking area will be described with reference to FIG. 17 and subsequent drawings.

Figure 17:
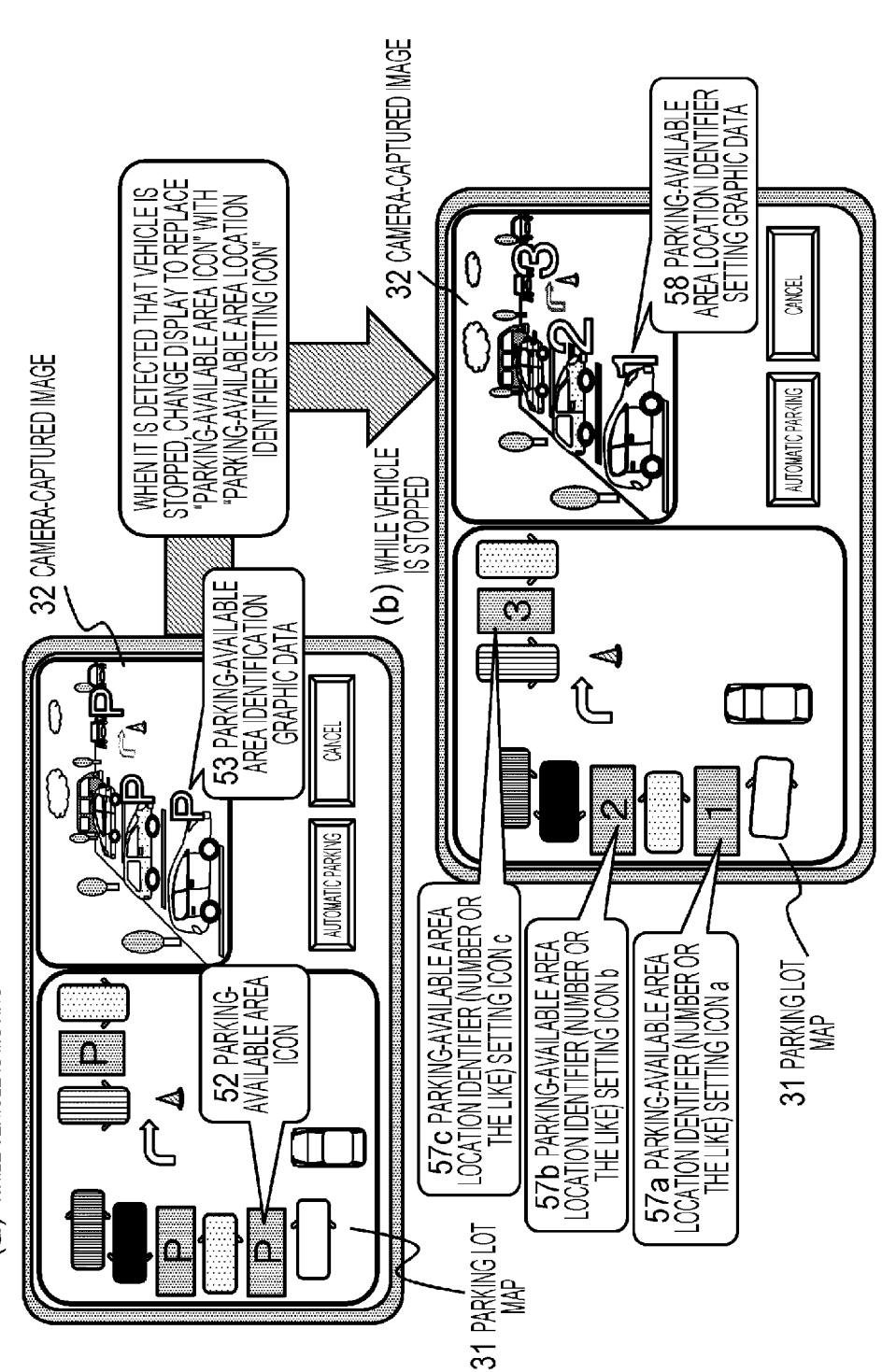
FIG. 17 is a diagram illustrating a specific example of display data generated by the information processing apparatus according to the present disclosure.

FIG. 17 is a diagram for explaining a change in data displayed on the display unit 30 of the vehicle 10.

A user (driver) drives the vehicle 10 to enter the parking lot 20, and thereafter the vehicle 10 is temporarily stopped on a travel path of the parking lot 20. While the vehicle is stopped, the user inputs information for designating a desired parking area to the vehicle 10 (=the information processing apparatus mounted on the vehicle 10).

The information processing apparatus of the vehicle 10 executes automatic parking in the designated parking area input by the user.

An example of data displayed on the display unit 30 illustrated in FIG. 17(*a*) is an example of data displayed while the user (driver) is driving to enter the parking lot 20 and travel on the travel path.

FIG. 17(*b*) is an example of data displayed while the user (driver) is temporarily stopped on the travel path of the parking lot 20.

The display data illustrated in FIG. 17(*a*) and the display data illustrated in FIG. 17(*b*) are different in an icon displayed in a vacant area in the parking lot map 31, that is, a parking-available area, and graphic data displayed in a vacant area in the camera-captured image 32.

The icon displayed in the vacant area in the parking lot map 31 illustrated in FIG. 17(*a*), that is, the icon displayed on the display unit 30 while the vehicle 10 is traveling, is a "parking-available area icon 52" described above. The "parking-available area icon 52" is an icon displayed in a vacant area in the parking lot map 31, that is, a parking-available area, and is an icon including a letter "P".

In addition, the "parking-available area identification graphic data 53" displayed in the vacant area in the camera-captured image 32 is also graphic data including a letter "P".

On the other hand, the display data illustrated in FIG. 17(*b*), that is, the icons displayed in the vacant areas in the parking lot map 31 on the display unit 30 while the vehicle 10 is stopped, are displayed as icons including different identifiers (e.g., numbers 1, 2, 3, . . . ) in the respective areas, rather than the letter "P", as illustrated in FIG. 17(*b*).

That is, as illustrated in FIG. 17(*b*), a "parking-available area location identifier setting icon 57" is displayed in the vacant area in the parking lot map 31.

In addition, the graphic data displayed in the vacant areas in the camera-captured image 32, i.e., the letter "P", is also replaced with "parking-available area location identifier setting graphic data 58" including different identifiers (numbers) corresponding to the respective vacant areas.

In the example illustrated in the drawing, three numerical values, i.e., 1, 2, and 3, are displayed as identifiers of the "parking-available area location identifier setting icon 57" and the "parking-available area location identifier setting graphic data 58".

The user can instantaneously determine that there are three vacant areas in the parking lot map 31 displayed on the display unit 30.

The user (driver) selects a desired parking area from these three vacant areas.

That is, while the vehicle 10 is stopped, the user inputs information for designating a desired parking area to the vehicle 10 (=the information processing apparatus mounted on the vehicle 10).

The information processing apparatus of the vehicle 10 executes automatic parking in the designated parking area input by the user.

Figure 18:
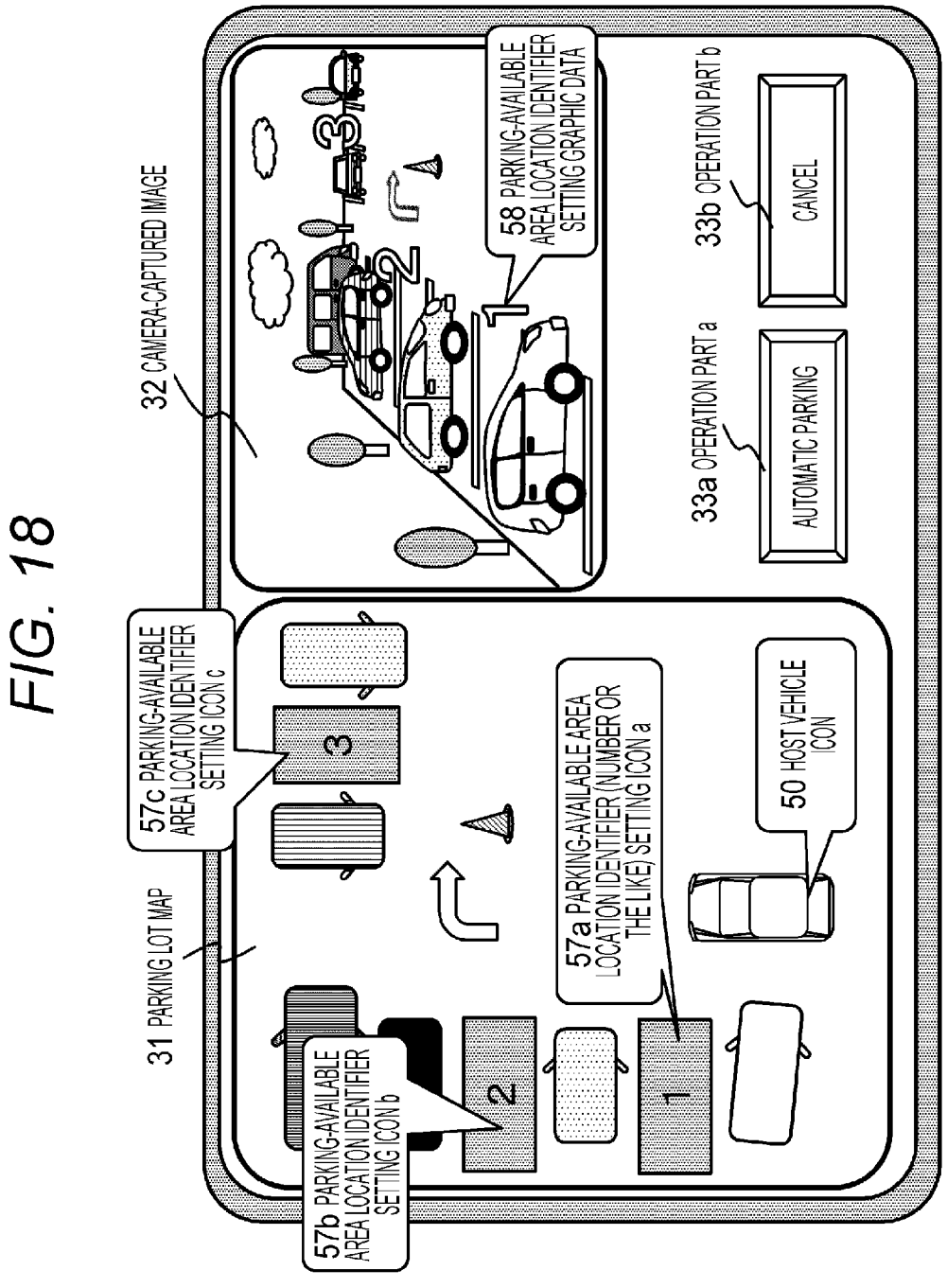
FIG. 18 is a diagram illustrating a specific example of display data generated by the information processing apparatus according to the present disclosure.

FIG. 18 illustrates an enlarged view of the display data displayed on the display unit 30 during a period when the vehicle is stopped as illustrated in FIG. 17(*b*).

As illustrated in FIG. 18, "parking-available area location identifier setting icons 57*a* to 57*c*" including identifiers (numbers 1, 2, and 3) are displayed in the respective vacant areas available for parking in the parking lot map 31. Similarly, the "parking-available area location identifier setting graphic data 58" including identifiers (numbers 1, 2, and 3) is also displayed in the vacant areas in the camera-captured image 32.

FIG. 19 illustrates an example of a process of selecting a desired parking area by a user (driver).

The display unit 30 is configured to be used as a touch panel, and the user (driver) touches an icon for a desired parking area. When the information processing apparatus in the vehicle 10 detects this touch, a process for automatically parking the vehicle in the parking area designated by the user is started.

Note that an instruction related to a desired parking area can be given by a user (driver) operating (touching) a UI of the display unit 30 as illustrated in FIG. 19, and alternatively, for example, in a case where the information processing apparatus includes a voice recognition unit, an instruction related to a desired parking area can also be given by a user (driver) inputting a voice.

For example, a user (driver) may utter
"park in no. 1".

By giving the foregoing utterance, the voice recognition unit of the information processing apparatus interprets the user's utterance, and starts a process for automatically parking the vehicle in a parking area in which identifier (1) is displayed, that is, a parking area in which the "parking-available area location identifier setting icon 57*a*" is displayed.

Note that, when the user (driver) notifies the vehicle 10 (=the information processing apparatus in the vehicle 10) of the instruction related to the desired parking area through the user's operation or voice on the display unit 30, the information processing apparatus changes a display mode of the "parking-available area location identifier setting icon 57*a*" in the parking lot map 31 displayed on the display unit 30 to indicate that the user's instruction has been received.

For example, as illustrated in FIG. 19, the icon is displayed in a color-changed state (from gray to white). Alternatively, the icon is displayed in a blinking manner. Alternatively, the display mode of the icon is changed, for example, by displaying a frame having a predetermined color (e.g., a red frame) around the icon.

By changing the display mode of the icon, the user (driver) can be confirmed that the vehicle 10 (=the information processing apparatus in the vehicle 10) has received an instruction related to a parking area designated by the user and a target parking area has been determined.

Thereafter, the vehicle 10 (=the information processing apparatus in the vehicle 10) starts a process for automatically parking the vehicle in the designated parking area.

Figure 20:
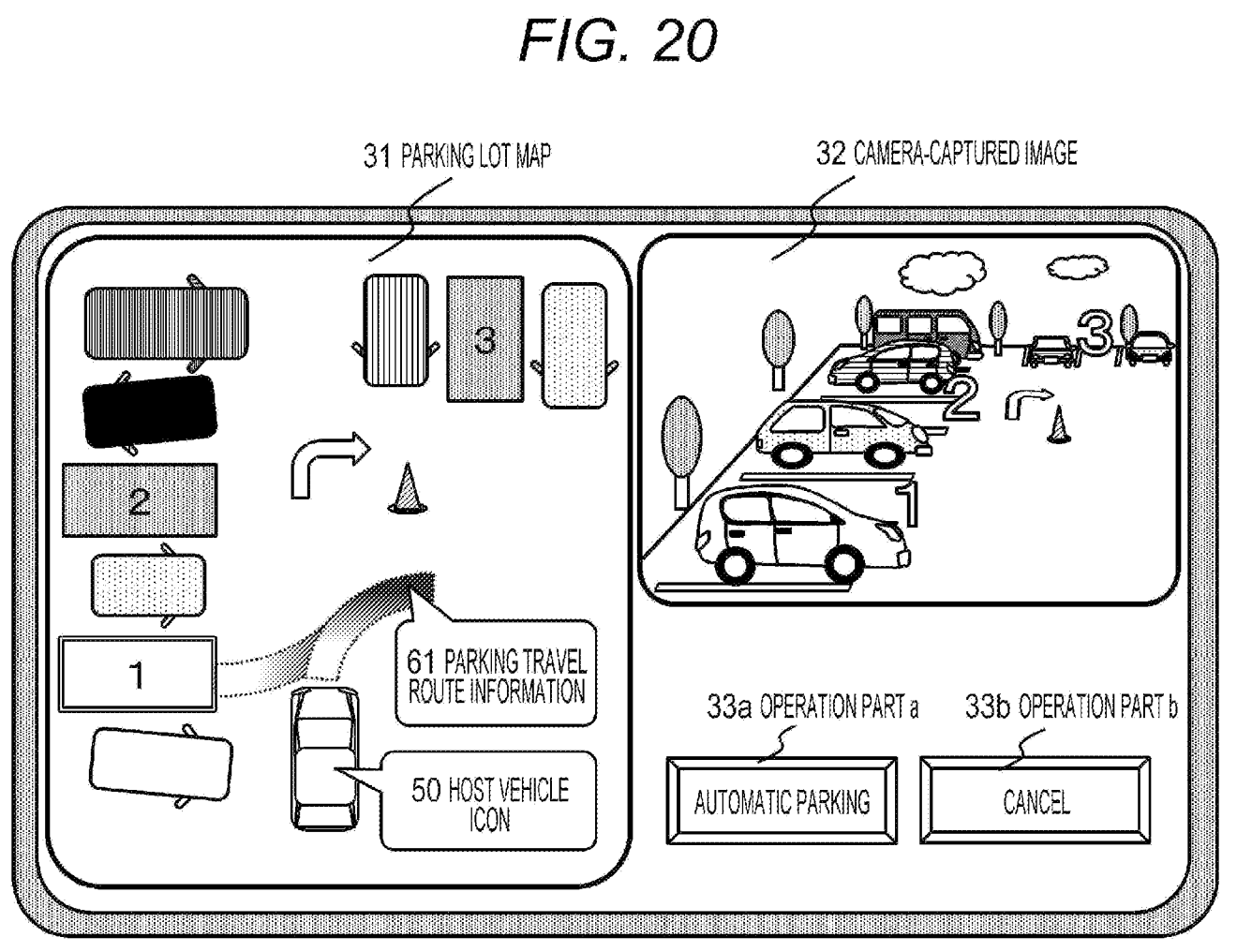

FIG. 20 illustrates an example of data displayed on the display unit 30 at a time point when the vehicle 10 starts the automatic parking process.

At the time point when the automatic parking process is started by the vehicle 10, parking travel route information 61 is displayed in the parking lot map 31 on the display unit 30 of the vehicle 10 as illustrated in FIG. 20. A forward travel route for moving forward from the host vehicle icon 50 displayed at a current location of the vehicle 10 and a backward travel route for entering the designated parking area "1" are displayed.

The forward travel route and the backward travel route are displayed, for example, as display data having different colors, e.g., green for the forward travel route and red for the backward travel route, with gradation.

The forward travel route is display data having gradation in which transparency decreases as a distance from the host vehicle icon 50 displayed at the current location of the vehicle 10 increases. Similarly, the backward travel route is display data having gradation in which transparency decreases as a distance from the planned parking area "1"

increases. The display data has such gradation enables the user to easily identify a turning location.

Note that the setting of the color and the gradation is an example, and the automatic parking travel route can be displayed using display data in various other display modes.

Figure 21:
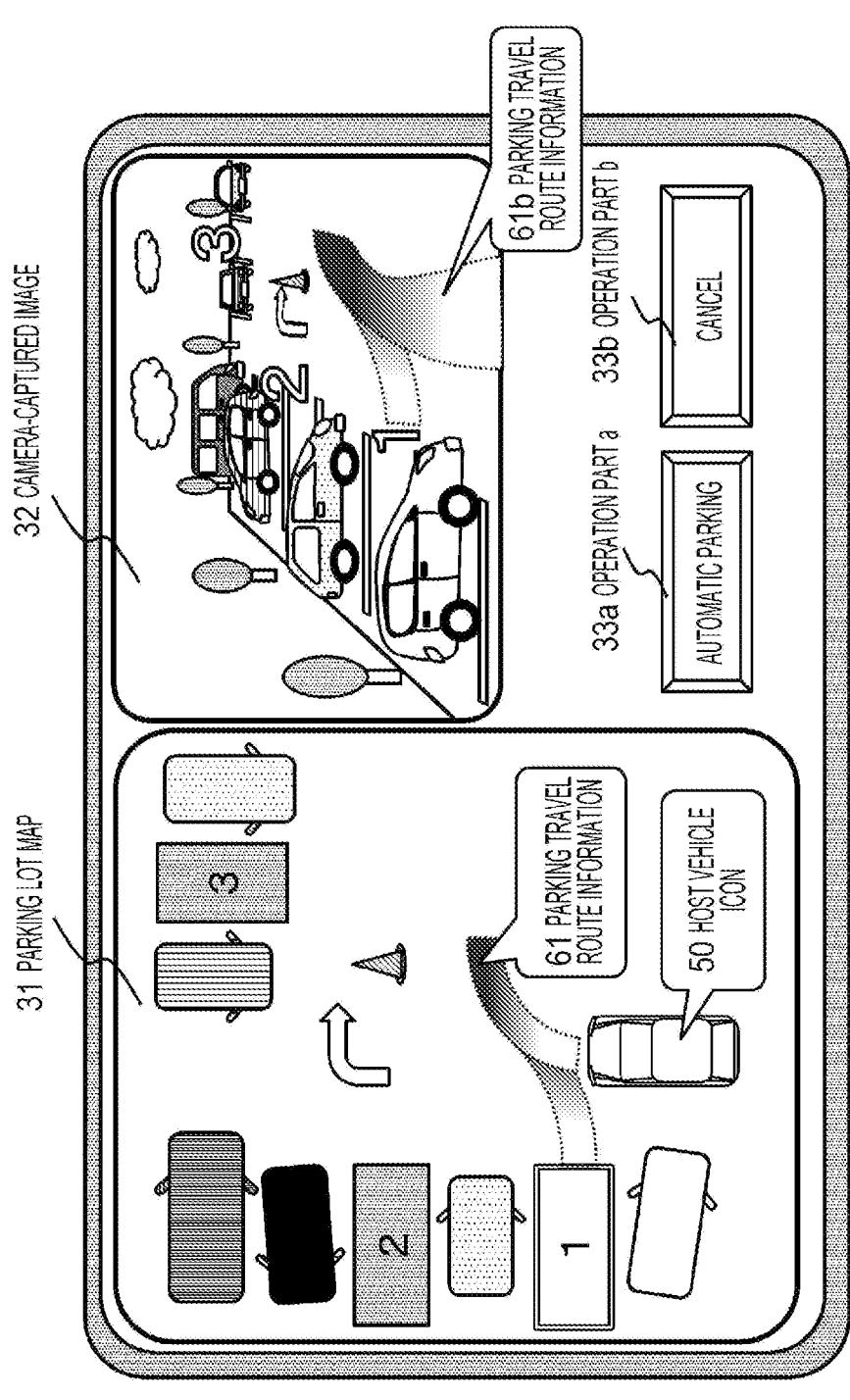
FIG. 21 is a diagram illustrating a specific example of display data generated by the information processing apparatus according to the present disclosure.

Note that, although the parking travel route information is displayed only in the parking lot map 31 in the example of FIG. 20, "parking travel route information 61*b*" may also be displayed as graphic data in the camera-captured image 32 in a superimposed manner, for example, as illustrated in FIG. 21.

The "parking travel route information 61*b*" in the camera-captured image 32 is also displayed, for example, as display data having similar color and gradation to the parking travel route information 61 displayed in the parking lot map 31 described above.

Moreover, a distance to a point of switch from forward traveling to backward traveling may be displayed on the display unit 30 at a time point when the vehicle 10 starts the automatic parking process.

A specific example thereof will be described with reference to FIG. 22.

The display data illustrated in FIG. 22 is an example of data displayed on the display unit 30 at a time point when the vehicle 10 starts the automatic parking process.

In the parking lot map 31 illustrated in FIG. 22, a stop location line 62 indicating a point of switch from forward traveling to backward traveling executed when the vehicle 10 performs the automatic parking process, and stop location distance information 63, which is a distance (7.64 m) to the stop location line 62, are displayed.

When the vehicle 10 starts forward traveling to initiate the automatic parking process, the stop location distance information 63 (7.64 m) is displayed such that the distance to the stop location line 62 gradually decreases, and the vehicle 10 stops at a time point when the distance to the stop location line 62 becomes 0. Then, the backward traveling is started.

By updating such display, the user (driver) can be confirmed that the automatic parking process is performed safely and reliably.

7. Examples of Various Types of Display Data Displayed on Display Unit of Vehicle Next, examples of various types of display data displayed on the display unit of the vehicle will be described.

Figure 23:
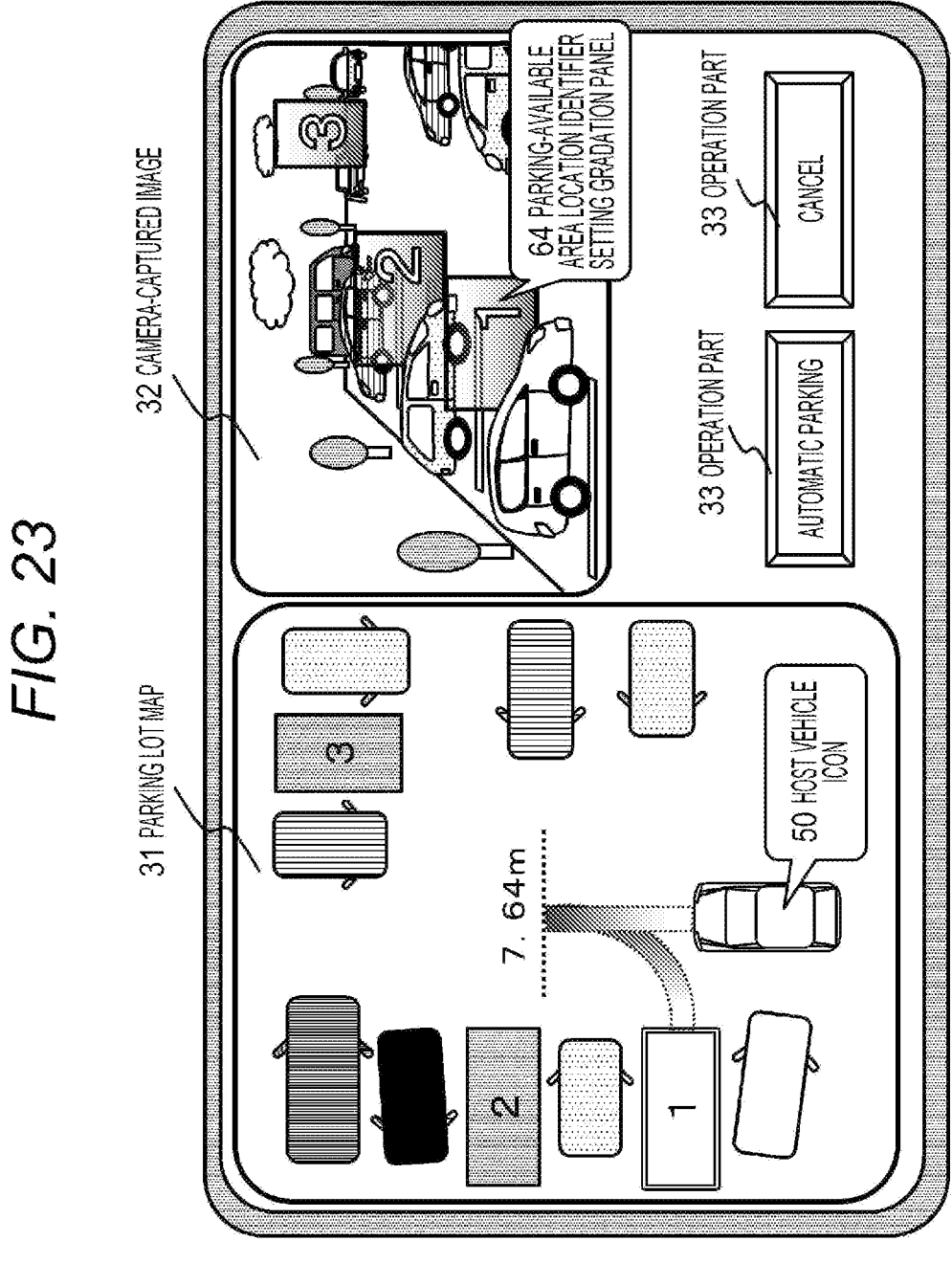
FIG. 23 is a diagram illustrating a specific example of display data generated by the information processing apparatus according to the present disclosure.

FIG. 23 illustrates an example in which a "parking-available area location identifier setting gradation panel 64" is displayed as graphic data superimposed on the camera-captured image 32.

Since various objects such as actual vehicles are displayed in the camera-captured image 32, there is a problem that it is difficult to recognize an identifier (number) indicating a vacant area.

In order to solve this problem, as illustrated in FIG. 23, the "parking-available area location identifier setting gradation panel 64" including an identifier (number) indicating a vacant area is displayed.

This gradation panel is, for example, graphic data having a blue color with gradation in which transparency becomes lower toward the road surface and higher upward.

Note that the setting of the color and the gradation is an example, and a panel set in another way may be displayed.

Furthermore, data may be displayed on the display unit 30 in different display modes between daytime and nighttime.

Since the inside of the vehicle 10 is dark at night, too bright display data makes the user feel dazzling.

Therefore, at night, data to be displayed on the display unit 30 is set as data that is dark over all.

An example of data displayed at night is illustrated in FIG. 24.

The background of the parking lot map 31 displayed on the display unit 30 illustrated in FIG. 24 is display data in gray with low luminance.

By performing such display control, the user can check data displayed on the display unit 30 without feeling dazzling even in a dark vehicle.

8. Process for Setting Desired Parking Area by User and Automatically Selecting Parking Area Reflecting User'S Setting Next, a process for setting a desired parking area by a user and automatically selecting a parking area reflecting the user's setting will be described.

In a parking lot in which a large number of parking areas are set, many users want to park in parking areas that they prefer to.

For example, in many cases, a parking area at a corner where there is no adjacent parked vehicle, a parking area close to an entrance of a supermarket, a parking area shaded by a tree, or the like is desired.

The embodiment to be described below is an embodiment in which a feature of a parking area desired by a user is input in advance, and the information processing apparatus of the vehicle 10 detects a parking area that matches the user's desire and presents the parking area to the user to perform automatic parking.

Figure 25:
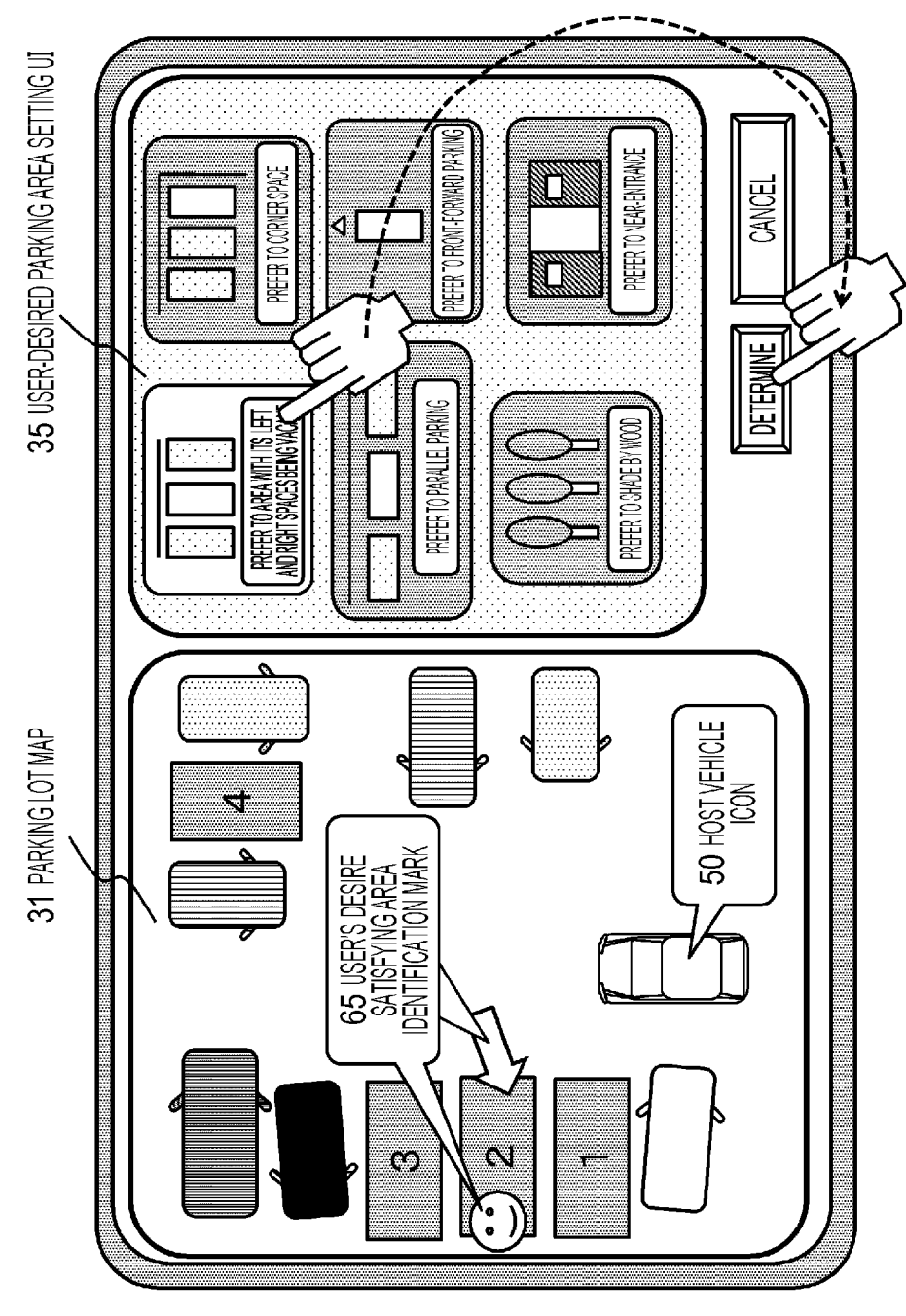
FIG. 25 is a diagram illustrating a specific example of display data generated by the information processing apparatus according to the present disclosure.

FIG. 25 is an example of data displayed on the display unit 30 of the vehicle 10. A user-desired parking area setting UI 35 is displayed on the right side of the parking lot map 31.

The user-desired parking area setting UI 35 is a UI for selecting and inputting a feature of a parking area desired by a user. In the example illustrated in the drawing, the following options are displayed.

(a) prefer to an area with its left and right spaces being empty (b) prefer to a corner space (c) prefer to parallel parking (d) prefer to front-forward parking (e) prefer to shade by wood (f) prefer to near-entrance The user inputs a certain number of options from these options. The input data is registered in the storage unit of the information processing apparatus of the vehicle 10.

The information processing apparatus analyzes features of vacant areas available for parking on the basis of information detected by the sensor and information input from the external device such as a parking management server, and determines whether or not each of the vacant areas is an area satisfying a user's desire.

Moreover, a vacant area satisfying the user's desire at the highest level is selected on the basis of a determination result, and the selected vacant area is notified to the user.

Specifically, for example, as illustrated in FIG. 25, a user's desire satisfying area identification mark 65 is displayed in a vacant area selected from the parking lot map 31 as satisfying the user's desire at the highest level.

By checking this mark, the user can know that this vacant area is a vacant area satisfying the user's desire.

Thereafter, when the user gives an instruction, for example, by touching the vacant area, a process for automatically parking the vehicle in this vacant area is started.

9. Embodiment in which Parking Lot Map is Displayed on Display Unit of User Terminal Next, an embodiment in which the parking lot map is displayed on a display unit of a user terminal will be described.

In the above-described embodiment, the parking lot map 31 is displayed on the display unit 30 in the vehicle 10.

This parking lot map may be displayed, for example, on a user terminal such as a smartphone of a user who has got off the vehicle 10.

A specific example thereof will be described with reference to FIG. 26.

Figure 26:
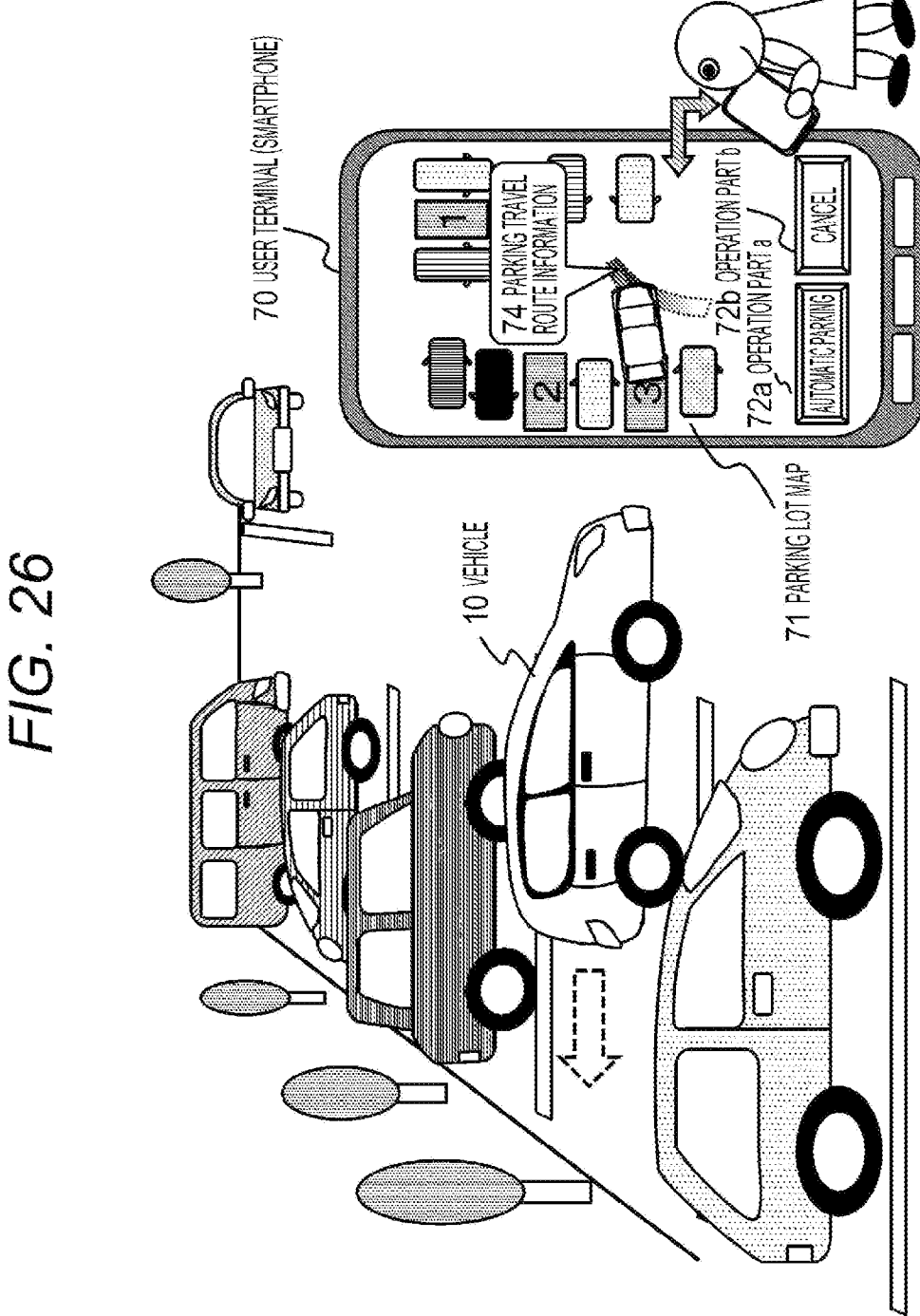
FIG. 26 is a diagram illustrating a specific example of display data generated by the information processing apparatus according to the present disclosure, and transmitted to and displayed on a user terminal.

FIG. 26 is a diagram illustrating a state in which the user gets off the vehicle 10 and checks how the vehicle 10 is automatically parked while viewing a parking lot map 71 displayed on a user terminal (a smartphone or the like) 70 in the parking lot 20.

The information processing apparatus of the vehicle 10 and the user terminal (smartphone) 70 communicate with each other via a communication unit.

The parking lot map 71 generated by the information processing apparatus of the vehicle 10 is displayed on the user terminal 70.

Data displayed in the parking lot map 71 is similar to the above-described data displayed in the parking lot map 31 on the display unit 30 of the vehicle 10.

For example, various icons such as a parked vehicle icon 51, a parking-available area icon 52, and a parking-available area location identifier setting icon 57 are displayed.

Moreover, an operation part 72 for starting a process for automatically parking the vehicle 10 is also displayed.

An operation part 72a is operated for the vehicle 10 to start automatic parking. An operation part 72b is an operation part operated to stop the automatic parking.

When the user selects one of the parking-available area location identifier setting icons 57 displayed on the parking lot map 71 and touches the operation part 72a, the vehicle 10 starts traveling for automatic parking toward a vacant area designated by the user.

Furthermore, at this timing, parking travel route information 74 similar to that described above with reference to FIGS. 20 to 22, etc. is displayed on the user terminal 70 held by the user.

In this way, the user can also designate a parking area, and instruct and control the vehicle 10 to, for example, start and stop traveling for automatic parking via a user terminal such as a smart phone even outside the vehicle 10.

10. Sequence of Processes Executed by Information Processing Apparatus According to Present Disclosure Next, a sequence of processes executed by the information processing apparatus according to the present disclosure will be described.

FIG. 27 is a flowchart illustrating an example of a sequence of processes executed by the information processing apparatus according to the present disclosure mounted on the vehicle 10.

Note that the processes of the flowchart illustrated in FIG. 27 are executed under the control of the data processing unit of the information processing apparatus according to the present disclosure. The information processing apparatus according to the present disclosure includes, for example, a data processing unit having a program execution function such as a CPU, and the data processing unit executes the processes following the flow illustrated in FIG. 27 according to a program stored in the storage unit in the information processing apparatus.

Hereinafter, each step of the flowchart illustrated in FIG. 27 will be described.

(Step S101)

First, in step S101, the data processing unit of the information processing apparatus mounted on the vehicle 10 determines, on the basis of information detected by the sensor or information input from the outside, which one of the following parking areas (a) and (b) each segmented parking area corresponds to:

(a) vacant area available for parking; and (b) parked vehicle-present area.

This process is started, for example, on the basis of an instruction from a driver (user) of the vehicle 10.

Note that, in a case where the vehicle 10 is an automated vehicle and a parking lot is set as a destination, the automated driving control unit may output an instruction to start a process for determining an area to the data processing unit, instead of the user input.

In the step S101, the data processing unit of the information processing apparatus determines, on the basis of at least one of information detected by the sensor provided in the vehicle 10 or information input from the external device such as a parking management server, which one of the following parking areas (a) and (b) each segmented parking area corresponds to:

(a) vacant area available for parking; and (b) parked vehicle-present area.

(Step S102)

Next, in step S102, the data processing unit of the information processing apparatus acquires feature information (color, location, forward-backward direction, size, etc.) about a vehicle parked in a parking area identified as "(b) parked vehicle-present area" as a result of determining a parking area in the step S101.

This feature information is also acquired using at least one of information detected by the sensor provided in the vehicle 10 or information input from the external device such as a parking management server.

Note that, as described above, the parking area may be determined in the step S101 and the feature information (color, location, forward-backward direction, size, etc.) about the parked vehicle may be acquired, by applying image analysis (AI analysis) using a learning model generated in advance.

(Step S103)

Next, in step S103, the data processing unit of the information processing apparatus displays following data on the display unit 30:

a "parking-available area icon" in the "(a) vacant area available for parking"; and a "parked vehicle icon" enabling identifying features (color, location, forward-backward direction, size, etc.) about a parked vehicle in the "(b) parked vehicle-present area".

A parking lot map in which each of these icons is set is generated and output to the display unit 30.

That is, the parking lot map 31 described with reference to FIG. 7, etc. is generated and displayed on the display unit 30.

Note that, although not described in the flow, the data processing unit of the information processing apparatus generates display data including another camera-captured image 32 for the parking lot map 31 and an operation part 33, and displays the display data on the display unit 30, as described with reference to FIG. 7 above.

(Step S104)

Moreover, in step S104, the data processing unit of the information processing apparatus acquires feature information (color, location, size, etc.) about a detected object (a pedestrian or an object on a road surface) other than vehicles, on the basis of at least one of information detected by the sensor or information input from the outside.

(Step S105)

Moreover, in step S105, the data processing unit of the information processing apparatus displays, in the parking lot map, "display data (icon)" enabling identifying the feature information (color, location, size, etc.) about the detected object (the pedestrian or the object on the road surface) other than vehicles.

The processes in the steps S104 and S105 correspond to the processes described with reference to FIGS. 12 to 15 above.

By performing such a data displaying process, the user (driver or the like) of the vehicle 10 can immediately determine which one of parked vehicles, persons, or other types of objects displayed on the display unit 30 corresponds to an actual vehicle, person, another type of object directly confirmed from the vehicle 10. As a result, it is possible to quickly select a parking area, avoid an approach to a person in advance or the like, thereby executing a parking process in a safe manner.

Note that, the processes of the steps S104 and S105 have been described as a sequence to be executed following the processes of the steps S101 to S103 in FIG. 27, but the processes of the steps S104 and S105 can be executed in parallel with the processes of the steps S101 to S103.

Next, a sequence of processes for the information processing apparatus of the vehicle 10 to automatically park the vehicle 10 will be described with reference to the flow illustrated in FIG. 28.

Note that, at a time point when the flow illustrated in FIG. 28 is started, the following display data described with reference to FIG. 7 above is displayed on the display unit 30 of the vehicle 10:

(a) parking lot map 31;
(b) camera-captured image 32; and
(c) operation part 33.

Furthermore, the icons described with reference to FIG. 7 above, that is, the host vehicle icon 50, the parked vehicle icon 51, and the parking-available area icon 52, are displayed on the parking lot map 31.

The processes of the steps including step S201 will be sequentially described.

(Step S201)

In step S201, the data processing unit of the information processing apparatus determines whether or not a vehicle has been stopped. Concerning determining whether or not the vehicle has been stopped, note that it may be determined that the vehicle has been stopped in a case where the vehicle is driven at a predetermined speed or less (e.g., 3 km/h or less).

In a case where it is determined that the vehicle has been stopped, the process proceeds to step S202.

(Step S202)

In a case where it is determined in the step S201 that the vehicle has been stopped, in step S202, the data processing unit of the information processing apparatus performs an icon display change process for changing parking-available area icons 52 in the parking lot map 31 displayed on the display unit 30 to parking-available area location identifier (numbers or the like) setting icons 57.

This process corresponds to the process described with reference to FIG. 17 above. That is, the icon display change process is performed to change the parking-available area icons 52 in the parking lot map 31 illustrated in FIG. 17(*a*) to the parking-available area location identifier (numbers 1, 2, and 3, or the like) setting icons 57 as illustrated in FIG. 17(*b*).

(Step S203)

Next, in step S203, the data processing unit of the information processing apparatus determines whether or not there is an input for designating a target parking area or an input for requesting automatic parking from a user.

For example, the input for designating the target parking area from the user corresponds to the process described with reference to FIG. 19 above.

The user (driver) touches an icon for the desired parking area. When the information processing apparatus in the vehicle 10 detects this touch, a process for automatically parking the vehicle in the parking area designated by the user is started.

Note that, as described above, an instruction related to a desired parking area can be given by a user (driver) operating (touching) a UI of the display unit 30 as illustrated in FIG. 19, and alternatively, for example, in a case where the information processing apparatus includes a voice recognition unit, an instruction related to a desired parking area can also be given by a user (driver) inputting a voice.

The "automatic parking" is started, for example, by operating the operation part a 33*a* among the data displayed on the display unit illustrated in FIG. 19.

The "automatic parking" is a process in which the automated driving control unit in the information processing apparatus of the vehicle 10 automatically selects a vacant parking area for parking and performs parking.

In a case where it is determined in step S203 that there is an input for designating a target parking area or an input for requesting automatic parking from a user, the process proceeds to step S204.

(Step S204)

In a case where it is determined in step S203 that there is an input for designating a target parking area or an input for requesting automatic parking from a user, in step S204, the information processing apparatus changes an icon display mode of the target parking area designated by the user or the target parking area selected according to an automatic parking execution algorithm.

This process corresponds to the process described with reference to FIG. 19 above. When the user (driver) notifies the vehicle 10 (=the information processing apparatus in the vehicle 10) of the instruction related to the desired parking area through the user's operation or voice on the display unit 30, the information processing apparatus changes a display mode of the "parking-available area location identifier setting icon 57" in the parking lot map 31 displayed on the display unit 30 to indicate that the user's instruction has been received.

Furthermore, even in a case where the automated driving control unit determines a target parking location as the "automatic parking" is executed, a display mode of the "parking-available area location identifier setting icon 57" in the parking lot map 31 displayed on the display unit 30 is changed.

For example, as illustrated in FIG. 19, a display color of the icon (parking-available area location identifier setting icon 57) for the determined target parking area is changed (from gray to white). Alternatively, the display mode of the icon displayed in a blinking manner is changed, for example, by displaying a frame having a predetermined color (e.g., a red frame) around the icon.

By changing the display mode of the icon, the user (driver) can be confirmed that the vehicle 10 (=the information processing apparatus in the vehicle 10) has determined a target parking area.

(Step S205)

Next, in step S205, the data processing unit of the information processing apparatus displays a planned travel route for parking the vehicle in the target parking area. Moreover, a temporary stop location line and information regarding a distance to the temporary stop location may be displayed.

This process corresponds to the process described with reference to FIGS. 20 to 22, etc. above.

As described with reference to FIG. 20 above, the parking travel route information 61 is displayed in the parking lot map 31. A forward travel route for moving forward from the host vehicle icon 50 displayed at a current location of the vehicle 10 and a backward travel route for entering the designated parking area are displayed.

The forward travel route and the backward travel route are displayed, for example, as display objects having different colors, e.g., green for the forward travel route and red for the backward travel route, with gradation.

As described with reference to FIG. 21 above, the parking travel route information 61 may be displayed on the camera-captured image 32 in a superimposed manner.

Moreover, as described with reference to FIG. 22, in the parking lot map 31, a stop location line 62 indicating a point of switch from forward traveling to backward traveling executed when the vehicle 10 performs the automatic parking process, and stop location distance information 63, which is a distance (e.g., 7.64 m) to the stop location line 62, may be displayed.

When the vehicle 10 starts forward traveling to initiate the automatic parking process, the stop location distance information 63 (e.g., 7.64 m) is displayed such that the distance to the stop location line 62 gradually decreases, and the vehicle 10 stops at a time point when the distance to the stop location line 62 becomes 0. Then, the backward traveling is started.

By updating such display, the user (driver) can be confirmed that the automatic parking process is performed safely and reliably.

(Step S206)

Next, in step S206, the data processing unit of the information processing apparatus automatically parks the vehicle in the target parking area.

(Step S207)

Next, in step S207, when the data processing unit of the information processing apparatus confirms that the process for automatically parking the vehicle in the target parking area has been terminated, the process ends.

Note that, as described with reference to FIG. 26 above, the parking lot map may be transmitted to and displayed on, for example, a user terminal such as a smartphone held by the user outside the vehicle 10, as well as the display unit 30 in the vehicle 10.

11. Example of Configuration of Information Processing Apparatus According to Present Disclosure Next, an example of a configuration of an information processing apparatus according to the present disclosure will be described.

Figure 29:
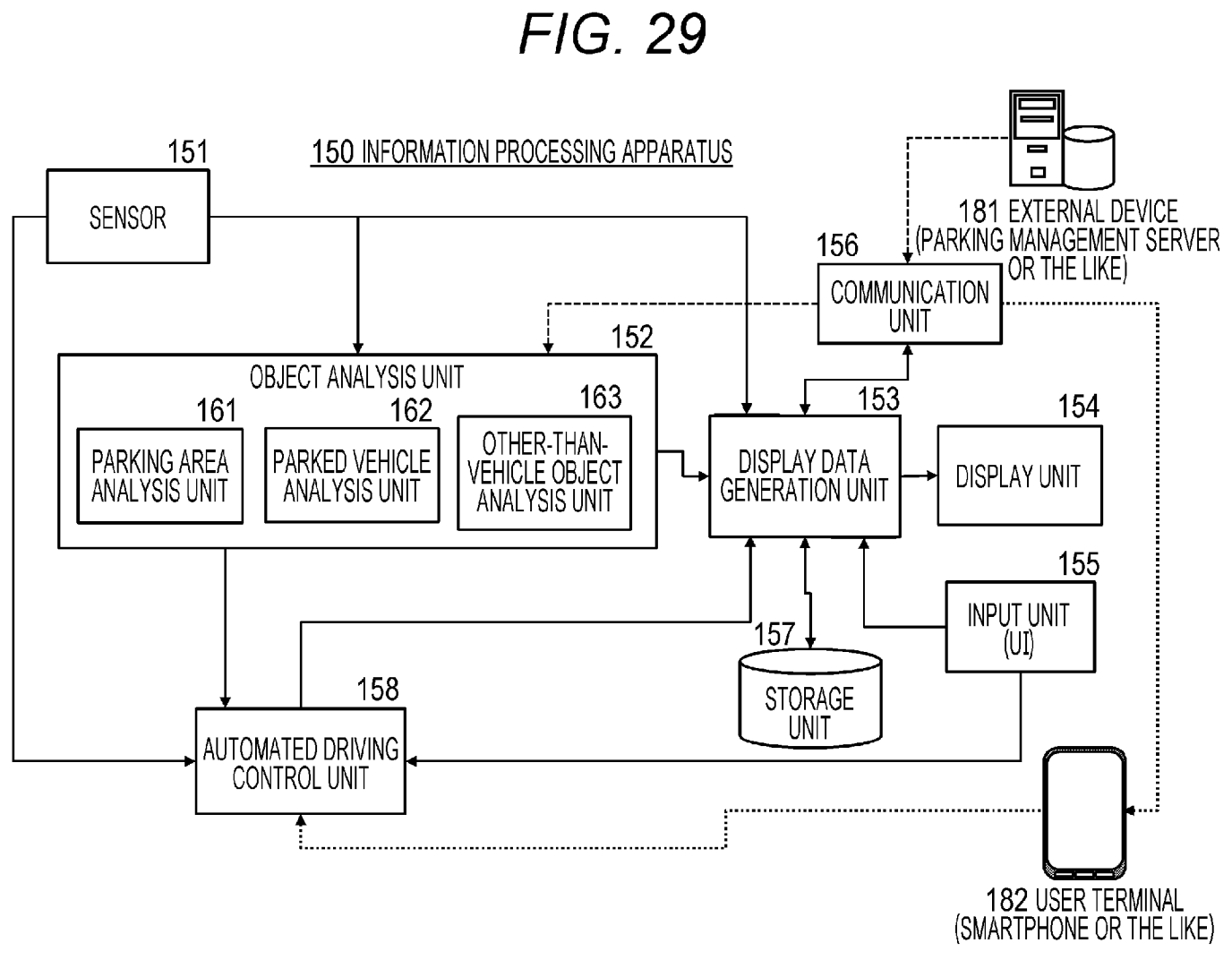

FIG. 29 is a block diagram illustrating an example of an information processing apparatus 150 according to the present disclosure mounted on the vehicle 10.

As illustrated in FIG. 29, the information processing apparatus 150 includes a sensor 151, an object analysis unit 152, a display data generation unit 153, a display unit 154, an input unit (UI) 155, a communication unit 156, a storage unit 157, and an automated driving control unit 158. The object analysis unit 152 and the display data generation unit 153 correspond to an example of "processing circuitry" in this disclosure.

The object analysis unit 152 includes a parking area analysis unit 161, a parked vehicle analysis unit 162, and an other-than-vehicle object analysis unit 163.

The sensor 151 is, for example, a sensor such as a camera, a light detection and ranging (LiDAR), a time of flight (ToF) sensor, or a radio detection and ranging (Radar).

Note that the light detection and ranging (LiDAR) or the ToF sensor is a sensor that outputs light such as laser light, for example, and analyzes light reflected by an object to measure a distance from a surrounding object.

Information detected by the sensor 151 is output to the object analysis unit 152, the display data generation unit 153, and the automated driving control unit 158.

The object analysis unit 152 includes a parking area analysis unit 161, a parked vehicle analysis unit 162, and an other-than-vehicle object analysis unit 163.

The parking area analysis unit 161 identifies whether each of the segmented parking areas in the parking lot is a vacant area in which no vehicle is parked, that is, a parking-available area, or a parking-unavailable area in which a vehicle is parked.

In addition, the parked vehicle analysis unit 162 acquires feature information about a parked vehicle, for example, feature information about a vehicle such as a color, a location, an orientation, and a size of the vehicle.

The other-than-vehicle object analysis unit 163 acquires feature information about various objects other than vehicles, such as, for example, a person, a triangular cone, a plant, an arrow painted on a road surface, and a crosswalk, for example, as a color of clothes, a location, an orientation, a size, and the like.

Note that the feature information about the vehicle, the person, and another object is analyzed on the basis of information detected by the sensor 151 such as a camera provided in the vehicle 10, information received from an external device 181 such as a parking management server via the communication unit 156, or the like.

Note that the object analysis unit 152 may be configured to analyze various objects, for example, through AI analysis using a learning model generated in advance.

The display data generation unit 153 generates display data to be displayed on the display unit 154 on the basis of the feature information about the vehicle, the person, or another object analyzed by the object analysis unit 152.

Specifically, the display data generation unit 153 generates the following display data described with reference to FIG. 7 above, and displays the display data on the display unit 154.

(a) parking lot map 31;

(b) camera-captured image 32; and (c) operation part 33

Using information analyzed by the parking area analysis unit 161 and the parked vehicle analysis unit 162 of the object analysis unit 152, the display data generation unit 153 outputs and displays, for example, the following icons in the "(a) parking lot map 31" displayed on the display unit 154.

a host vehicle icon 50 indicating a host vehicle;

a parked vehicle icon 51 indicating a parked vehicle; and a parking-available area icon 52 indicating a parking-available area.

These icons are icons described with reference to FIG. 7 above. For example, an icon enabling identifying a color, a parked location, a parked orientation, a size, and the like of a parked vehicle is generated and displayed as the parked vehicle icon 51.

Further, the display data generation unit 153 generates a person icon indicating a person, an on-road object icon, and the like using an analysis result of the other-than-vehicle object analysis unit 163 of the object analysis unit 152, and displays the person icon, the on-road object icon, and the like on the display unit 154.

These icons are icons described with reference to FIGS. 12 to 15 above, and an icon reflecting a color of clothes of a person; a color, a location, an orientation, a size, and the like of an object are generated and displayed.

Furthermore, as described with reference to FIG. 7, etc. above, the display data generation unit 153 also generates and displays parking-available area identification graphic data in the camera-captured image 32 displayed on the display unit 154.

As described with reference to FIGS. 20 to 23 above, the display data generation unit 153 further generates display data such as parking travel route information 61, stop location line 62, and stop location distance information 63 as illustrated in FIGS. 20 to 23, and displays the display data on the display unit 154.

Note that travel route information for generating the parking travel route information 61, the stop location line 62, and the stop location distance information 63 is input from the automated driving control unit 158 that calculates a travel route for automatic parking.

The parking lot map including each of the above-described icons generated by the display data generation unit 153, the camera-captured image on which the graphic data is superimposed, and the like are displayed on the display unit 154.

A user (driver) who intends to park a vehicle can clearly determine a parked vehicle, a person, and another type of object by viewing the display data displayed on the display unit 154 of the vehicle.

The input unit (UI) 155 is, for example, a user interface (UI) used for a user (driver or the like) to input, for example, an instruction for automatic parking, information for selecting a target parking area, or the like. The input unit (UI) 155 may be constituted by using a touch panel configured on the display unit 154.

Furthermore, the input unit (UI) 155 may include a voice input unit.

Information input from the input unit (UI) 155 is input to the display data generation unit 153 and the automated driving control unit 158.

For example, when information for designating a target parking area is input from the input unit (UI) 155, the display data generation unit 153 changes a display mode of a parking-available area identifier setting icon for the designated target parking area. This process corresponds to the process described with reference to FIG. 19 above.

Furthermore, the automated driving control unit 158 starts automatic parking toward the target parking area in accordance with the information for selecting the target parking area input from the input unit (UI) 155.

The communication unit 156 communicates with an external device, for example, an external device 181 such as a parking management server or a road management server, and a user terminal 182 such as a smartphone.

For example, the communication unit 156 receives information on whether or not a vehicle is parked in each parking area, information about a parked vehicle, and the like from the external device 181, and outputs the received information to the object analysis unit 152. This information is used for the object analysis unit 152 to analyze an object.

Furthermore, the communication unit 156 also transmits display the data such as a parking lot map generated by the display data generation unit 153 to the user terminal 182 such as a smart phone.

This process is the process described with reference to FIG. 26 above, and the user can operate the user terminal 182 such as a smartphone from the outside of the vehicle to perform automatic parking.

The parking lot map generated by the display data generation unit 153 is recorded in the storage unit 157 in association with information on a time at which the map is generated.

This map is used when the parking lot map is displayed to be enlarged or reduced as described with reference to FIG. 16 above.

The automated driving control unit 158 executes a process for driving a vehicle in an automated manner such as automatic parking. In a case where information for selecting a target parking area is input from the input unit (UI) 155 as described above, travel is controlled to automatically park the vehicle in the target parking area.

12. Example of Hardware Configuration of Information Processing Apparatus According to Present Disclosure Next, an example of a hardware configuration of the information processing apparatus according to the present disclosure will be described with reference to FIG. 30.

Figure 30:
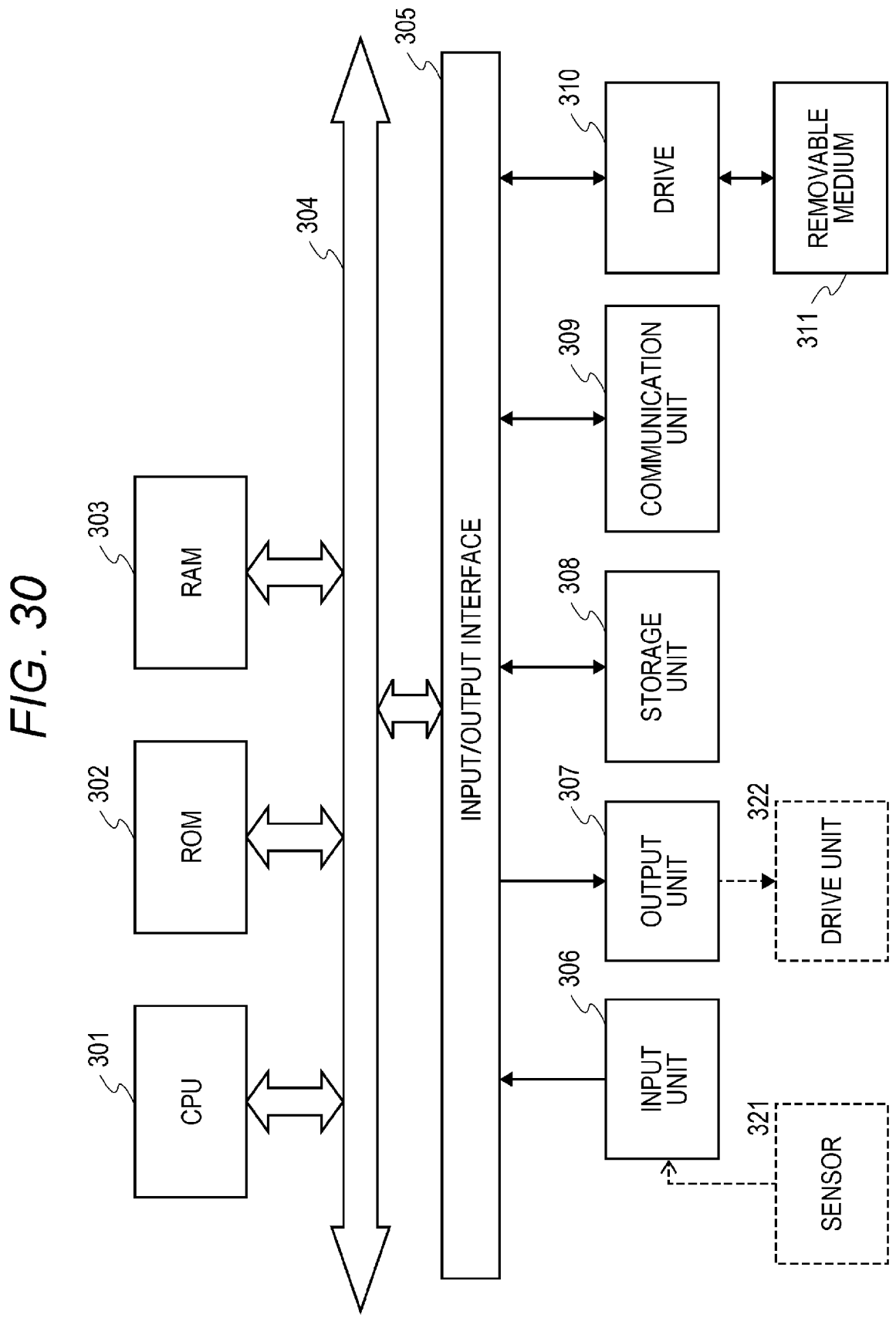
FIG. 30 is a diagram illustrating an example of a hardware configuration of the information processing apparatus according to the present disclosure.

Note that the information processing apparatus is mounted in the vehicle 10. The hardware configuration illustrated in FIG. 30 is an example of a hardware configuration of the information processing apparatus in the vehicle 10.

The hardware configuration illustrated in FIG. 30 will be described.

A central processing unit (CPU) 301 functions as a data processing unit that executes various processes according to a program stored in a read only memory (ROM) 302 or a storage unit 308. For example, processes according to the sequence described in the above-described embodiment is executed. A random access memory (RAM) 303 stores a program to be executed by the CPU 301, data, and the like. The CPU 301, the ROM 302, and the RAM 303 are connected to each other by a bus 304.

The CPU 301 is connected to an input/output interface 305 via the bus 304, and an input unit 306 including various switches, a touch panel, a microphone, a user input unit, a camera, a unit for acquiring data on situations of various sensors 321 such as LiDAR, and the like, and an output unit 307 including a display, a speaker, and the like are connected to the input/output interface 305.

The output unit 307 also outputs drive information to a drive unit 322 of the vehicle.

A command, situation data, or the like is input from the input unit 306 to the CPU 301 to execute various processes, and processing results are output, for example, to the output unit 307.

The storage unit 308 connected to the input/output interface 305 includes, for example, a hard disk and the like, and stores a program to be executed by the CPU 301 and various kinds of data. The communication unit 309 functions as a transmission/reception unit for data communication via a network such as the Internet or a local area network, and communicates with an external device.

In addition to the CPU, a graphics processing unit (GPU) may be provided as a unit dedicated for processing image information and the like input from the camera.

A drive 310 connected to the input/output interface 305 drives a removable medium 311 such as a magnetic disk, an optical disk, a magneto-optical disk, or a semi-conductor memory such as a memory card, and records or reads data.

13. Summary of Configuration of Present Disclosure

Hereinabove, the embodiments of the present disclosure have been described in detail with reference to specific embodiments. However, it is obvious to those skilled in the art that modifications and substitutions may be made to the embodiments without departing from the gist of the present disclosure. That is, the present disclosure has been disclosed in the form of exemplification, and should not be interpreted restrictively. In order to determine the gist of the present disclosure, it is required to consider the claims.

Note that the technology disclosed in the present specification can have the following configurations.

(1) An information processing apparatus, comprising:

processing circuitry configured to acquire, by a sensor, feature information about another vehicle in a parking lot, generate a parking lot map including a vehicle icon corresponding to the another vehicle, wherein the vehicle icon indicates the feature information about the another vehicle, and display the parking lot map with the vehicle icon.

(2) The information processing apparatus according to (1), wherein the feature information about the another vehicle is a color of the another vehicle, and the vehicle icon indicates the color of the another vehicle.

(3) The information processing apparatus according to (1) or (2), wherein the feature information about the another vehicle is an orientation of the another vehicle, and the vehicle icon indicates the orientation of the another vehicle.

(4) The information processing apparatus according to (3), wherein the vehicle icon indicates one or more of a side mirror, a headlight, a windshield, and a forward-backward direction identification mark based on the orientation of the another vehicle.

(5) The information processing apparatus according to any one of (1) to (4), wherein the feature information about the another vehicle includes one or more of a color, an orientation, a location, a size, a vehicle brand, and a vehicle type of the another vehicle, and the vehicle icon indicates the one or more of the color, the orientation, the location, the size, the vehicle brand, and the vehicle type of the another vehicle.

(6) The information processing apparatus according to any one of (1) to (5), wherein the processing circuitry is further configured to determine whether each parking area in the parking lot is a parking-available area where no other vehicle is parked or a parking-unavailable area where the another vehicle is parked, wherein the parking lot map includes the parking-available area indicated by a parking-available area icon and the parking-unavailable area indicated by the vehicle icon indicating the feature information about the another vehicle parked in the parking area.

(7) The information processing apparatus according to (6), wherein the processing circuitry is further configured to display parking-available area identification graphic data indicating the parking-available area superimposed on a camera-captured image.

(8) The information processing apparatus according to (6) or (7), wherein in response to detecting that a host vehicle is stopped, the processing circuitry is further configured to change a display mode of the parking-available area icon in the parking lot map.

(9) The information processing apparatus according to (8), wherein in response to detecting that the host vehicle is stopped, the processing circuitry is further configured to change a plurality of parking-available area icons in the parking lot map to identifier setting icons to which identifiers are set.

(10) The information processing apparatus according to any one of (1) to (9), wherein in response to determining a target parking location at which a host vehicle is to be parked, the processing circuitry is further configured to display information on a parking travel route from a current location of the host vehicle to the target parking location on the parking lot map.

(11) The information processing apparatus according to (10), wherein the processing circuitry is further configured to display the information on the parking travel route as graphic data having gradation depending on a distance from a location of the host vehicle on the parking lot map.

(12) The information processing apparatus according to (10) or (11), wherein the processing circuitry is further configured to display graphic data indicating the parking travel route from the current location of the host vehicle to the target parking location superimposed on a camera-captured image.

(13) The information processing apparatus according to any one of (1) to (12), wherein the processing circuitry is further configured to acquire feature information about an object other than the another vehicle in the parking lot, generate an object icon indicating a feature of the object other than the another vehicle, and display the parking lot map with the object icon.

(14) The information processing apparatus according to (13), wherein the feature information about the object is a color of the object, and the object icon indicates the color of the object.

(15) The information processing apparatus according to (13) or (14), wherein the processing circuitry is further configured to acquire a color of clothes of a person in the parking lot, generate a person icon indicating the color of the clothes of the person, and display the parking lot map with the person icon.

(16) The information processing apparatus according to any one of (13) to (15), wherein the processing circuitry is further configured to acquire a color of a cone in the parking lot, and generate the object icon indicating the color of the cone.

(17) The information processing apparatus according to any one of (13) to (16), wherein the processing circuitry is further configured to acquire a color of drawing information on a road surface in the parking lot, and generate the object icon indicating the color of the drawing information on the road surface in the parking lot.

(18) The information processing apparatus according to any one of (1) to (17), wherein the processing circuitry is further configured to transmit the parking lot map including the vehicle icon to an external user terminal.

(19) An information processing method executed by an information processing apparatus, the information processing method comprising:

acquiring, by a sensor, feature information about another vehicle in a parking lot;

generating, by processing circuitry, a parking lot map including a vehicle icon corresponding to the another vehicle, wherein the vehicle icon indicates the feature information about the another vehicle, and displaying, by the processing circuitry, the parking lot map with the vehicle icon.

(20) A non-transitory computer-readable storage medium storing computer-readable instructions thereon which, when executed by a computer, causes the computer to perform a method, the method comprising:

acquiring, by a sensor, feature information about another vehicle in a parking lot;

generating, by processing circuitry, a parking lot map including a vehicle icon corresponding to the another vehicle, wherein the vehicle icon indicates the feature information about the another vehicle, and displaying, by the processing circuitry, the parking lot map with the vehicle icon.

Furthermore, the series of processes described in the specification can be executed by hardware, software, or a combination of hardware and software. In a case where the processes are executed by software, a program in which a sequence of processes are recorded can be installed in a memory of a computer incorporated in dedicated hardware, or the program can be installed in a general-purpose computer capable of executing various types of processes. For example, the program can be recorded in advance in a recording medium. In addition to installing the program in the computer from the recording medium, the program can be received via a network such as a local area network (LAN) or the Internet and installed in a built-in recording medium such as a hard disk.

Note that the various processes described in the specification may be executed not only in the above-described time-series order but also in parallel or individually according to the processing capability of the apparatus that executes the processes or if necessary. Furthermore, in the present specification, the system is a logical set of a plurality of devices, and all of the devices may be contained in the same housing. However, the devices of the system are not limited to being all contained in the same housing.

It should be understood by those skilled in the art that various modifications, combinations, sub-combinations and alterations may occur depending on design requirements and other factors insofar as they are within the scope of the appended claims or the equivalents thereof.

INDUSTRIAL APPLICABILITY

As described above, according to an embodiment of the present disclosure, by generating and displaying a parking lot map including icons that enable identifying features of various objects in a parking lot, such as parked vehicles and persons, it is possible to quickly determine a location of an actual vehicle or the like with high accuracy.

Specifically, for example, an image processing apparatus includes: an object analysis unit that acquires feature information about a vehicle or a person in a parking lot, e.g., information on at least one feature among a color, an orientation, a location, a size, and a vehicle type, using information detected by a sensor; and a display data generation unit that generates a parking lot map including an icon corresponding to the vehicle or the person to output the generated parking lot map to a display unit. The display data generation unit generates an icon that enables identifying information on at least one feature among a color, an orientation, a location, a size, and a vehicle type of an object such as a vehicle and a person acquired by the object analysis unit, and outputs the generated icon to the display unit.

With this configuration, by generating and displaying a parking lot map including icons that enable identifying features of various objects in a parking lot, such as parked vehicles and persons, it is possible to quickly determine a location of an actual vehicle or the like with high accuracy.

REFERENCE SIGNS LIST

10 Vehicle (host vehicle)
20 Parking lot
30 Display unit
31 Parking lot map
32 Camera-captured image
33 Operation part
35 User-desired parking area setting UI
50 Host vehicle icon
51 Parked vehicle icon (another vehicle icon)
52 Parking-available area icon
53 Parking-available area identification graphic data
54 Person icon
55 On-road object icon
56 Host vehicle travel route information
57 Parking-available area location identifier setting icon
58 Parking-available area location identifier setting graphic data
61 Parking travel route information
62 Stop location line
63 Stop location distance information 64 Parking-available area location identifier setting gradation panel
65 User's desire satisfying area identification mark
70 User terminal (smartphone)
71 Parking lot map
72 Operation part
74 Parking travel route information
150 Information processing apparatus
151 Sensor
152 Object analysis unit
153 Display data generation unit
154 Display unit
155 Input unit (UI)
156 Communication unit
157 Storage unit
158 Automated driving control unit
161 Parking area analysis unit
162 Parked vehicle analysis unit
163 Other-than-vehicle object analysis unit
181 External device
182 User terminal
301 CPU
302 ROM
303 RAM
304 Bus
305 Input/output interface
306 Input unit
307 Output unit
308 Storage unit
309 Communication unit
310 Drive
311 Removable medium
321 Sensor
322 Drive unit

The invention claimed is:

1. An information processing apparatus comprising:
processing circuitry configured to
acquire, by a sensor, feature information about another vehicle in a parking lot,
generate a parking lot map including a vehicle icon corresponding to the another vehicle, wherein the vehicle icon indicates the feature information about the another vehicle, wherein the parking lot map is a virtual image of the parking lot viewed from above, and
simultaneously display the parking lot map with the vehicle icon and a camera-captured image captured by a camera of a host vehicle,
wherein in response to determining a target parking location at which the host vehicle is to be parked, display the information on a parking travel route from a current location of the host vehicle to the target parking location on the parking lot map.

2. The information processing apparatus according to claim 1,
wherein the feature information about the another vehicle is a color of the another vehicle, and
the vehicle icon indicates the color of the another vehicle.

3. The information processing apparatus according to claim 1,
wherein the feature information about the another vehicle is an orientation of the another vehicle, and
the vehicle icon indicates the orientation of the another vehicle.

4. The information processing apparatus according to claim 3,
wherein the vehicle icon indicates one or more of a side mirror, a headlight, a windshield, and a forward-backward direction identification mark based on the orientation of the another vehicle.

5. The information processing apparatus according to claim 1,
wherein the feature information about the another vehicle includes one or more of a color, an orientation, a location, a size, a vehicle brand, and a vehicle type of the another vehicle, and
the vehicle icon indicates the one or more of the color, the orientation, the location, the size, the vehicle brand, and the vehicle type of the another vehicle.

6. The information processing apparatus according to claim 1,
wherein the processing circuitry is further configured to
determine whether each parking area in the parking lot is a parking-available area where no other vehicle is parked or a parking-unavailable area where the another vehicle is parked,
wherein the parking lot map includes the parking-available area indicated by a parking-available area icon and the parking-unavailable area indicated by the vehicle icon indicating the feature information about the another vehicle parked in the parking area.

7. The information processing apparatus according to claim 6,
wherein the processing circuitry is further configured to
display parking-available area identification graphic data indicating the parking-available area superimposed on a camera-captured image.

8. The information processing apparatus according to claim 6,
wherein in response to detecting that a host vehicle is stopped, the processing circuitry is further configured to change a display mode of the parking-available area icon in the parking lot map.

9. The information processing apparatus according to claim 8,
wherein in response to detecting that the host vehicle is stopped, the processing circuitry is further configured to change a plurality of parking-available area icons in the parking lot map to identifier setting icons to which identifiers are set.

10. The information processing apparatus according to claim 1,
wherein the processing circuitry is further configured to display the information on the parking travel route as graphic data having gradation depending on a distance from a location of the host vehicle on the parking lot map.

11. The information processing apparatus according to claim 1,
wherein the processing circuitry is further configured to display graphic data indicating the parking travel route from the current location of the host vehicle to the target parking location superimposed on a camera-captured image.

12. The information processing apparatus according to claim 1,
wherein the processing circuitry is further configured to acquire feature information about an object other than the another vehicle in the parking lot,
generate an object icon indicating a feature of the object other than the another vehicle, and
display the parking lot map with the object icon.

13. The information processing apparatus according to claim 12, wherein the feature information about the object is a color of the object, and the object icon indicates the color of the object.

14. The information processing apparatus according to claim 12, wherein the processing circuitry is further configured to acquire a color of clothes of a person in the parking lot, generate a person icon indicating the color of the clothes of the person, and display the parking lot map with the person icon.

15. The information processing apparatus according to claim 12, wherein the processing circuitry is further configured to acquire a color of a cone in the parking lot, and generate the object icon indicating the color of the cone.

16. The information processing apparatus according to claim 12, wherein the processing circuitry is further configured to acquire a color of drawing information on a road surface in the parking lot, and generate the object icon indicating the color of the drawing information on the road surface in the parking lot.

17. The information processing apparatus according to claim 1, wherein the processing circuitry is further configured to transmit the parking lot map including the vehicle icon to an external user terminal.

18. An information processing method executed by an information processing apparatus, the information processing method comprising:

acquiring, by a sensor, feature information about another vehicle in a parking lot;

generating, by processing circuitry, a parking lot map including a vehicle icon corresponding to the another vehicle, wherein the vehicle icon indicates the feature information about the another vehicle, wherein the parking lot map is a virtual image of the parking lot viewed from above, and simultaneously displaying, by the processing circuitry, the parking lot map with the vehicle icon and a camera-captured image captured by a camera of a host vehicle, wherein in response to determining a target parking location at which the host vehicle is to be parked, displaying information on a parking travel route from a current location of the host vehicle to the target parking location on the parking lot map.

19. A non-transitory computer-readable storage medium storing computer-readable instructions thereon which, when executed by a computer, causes the computer to perform a method, the method comprising:

acquiring feature information about another vehicle in a parking lot;

generating a parking lot map including a vehicle icon corresponding to the another vehicle, wherein the vehicle icon indicates the feature information about the another vehicle, wherein the parking lot map is a virtual image of the parking lot viewed from above; and simultaneously displaying the parking lot map with the vehicle icon and a camera-captured image captured by a camera of a host vehicle, wherein in response to determining a target parking location at which the host vehicle is to be parked, displaying information on a parking travel route from a current location of the host vehicle to the target parking location on the parking lot map.

\* \* \* \* \*